US008854553B2

(12) United States Patent
Chavez et al.

(10) Patent No.: US 8,854,553 B2
(45) Date of Patent: Oct. 7, 2014

(54) VIDEO DISPLAY CORRECTION TO PROVIDE ON-AXIS VIEW AT AN OFF-AXIS ANGLE

(75) Inventors: Abraham Chavez, Whittier, CA (US); Byun Kil Kang, West Covina, CA (US)

(73) Assignee: Flex Creations, LLC, Whittier, CA (US)

( * ) Notice: Subject to any disclaimer, the term of this patent is extended or adjusted under 35 U.S.C. 154(b) by 583 days.

(21) Appl. No.: 12/776,344

(22) Filed: May 7, 2010

(65) Prior Publication Data

US 2011/0273613 A1    Nov. 10, 2011

(51) Int. Cl.
| | |
|---|---|
| *H04N 9/74* | (2006.01) |
| *H04N 7/01* | (2006.01) |
| *H04N 11/20* | (2006.01) |
| *H04N 5/14* | (2006.01) |
| *H04N 9/64* | (2006.01) |
| *G06T 3/00* | (2006.01) |
| *G06T 3/40* | (2006.01) |
| *H04N 5/21* | (2006.01) |

(52) U.S. Cl.
CPC ............... *H04N 7/0122* (2013.01); *G06T 3/00* (2013.01); *G06T 3/40* (2013.01); *H04N 5/21* (2013.01)
USPC ........... 348/580; 348/441; 348/571; 348/575; 348/578; 348/581

(58) Field of Classification Search
None
See application file for complete search history.

(56) References Cited

U.S. PATENT DOCUMENTS

| | | | | |
|---|---|---|---|---|
| 2004/0251719 | A1* | 12/2004 | Brauer | 297/217.3 |
| 2005/0078192 | A1* | 4/2005 | Sakurai et al. | 348/207.99 |
| 2009/0251607 | A1* | 10/2009 | Stoddart et al. | 348/554 |
| 2010/0182336 | A1* | 7/2010 | Haga et al. | 345/593 |

OTHER PUBLICATIONS

"Welcome to the Projector Pros. Keystone Correction" Jul. 20, 2008.*

* cited by examiner

*Primary Examiner* — Jefferey Harold
*Assistant Examiner* — Michael Teitelbaum
(74) *Attorney, Agent, or Firm* — Blakely, Sokoloff, Taylor & Zafman, LLP

(57) ABSTRACT

Embodiments describe methods, apparatus and systems to provide video display correction to provide an on-axis view at an off-axis angle so that the display surface displays a rectangular video image. For instance, a device may receive a stream of video data to be displayed on a display surface of a display, the video data having a first rectangular aspect ratio to be viewed from an on-axis location with respect to the display surface. The device may also receive a user selection of an off-axis viewing angle with respect to the display surface. The device may then correct the first rectangular aspect ratio to a second, non-rectangular aspect ratio based on the off-axis viewing angle, so that from the off-axis angle, the display surface appears to display a rectangular video image. Other embodiments are also described and claimed.

23 Claims, 13 Drawing Sheets

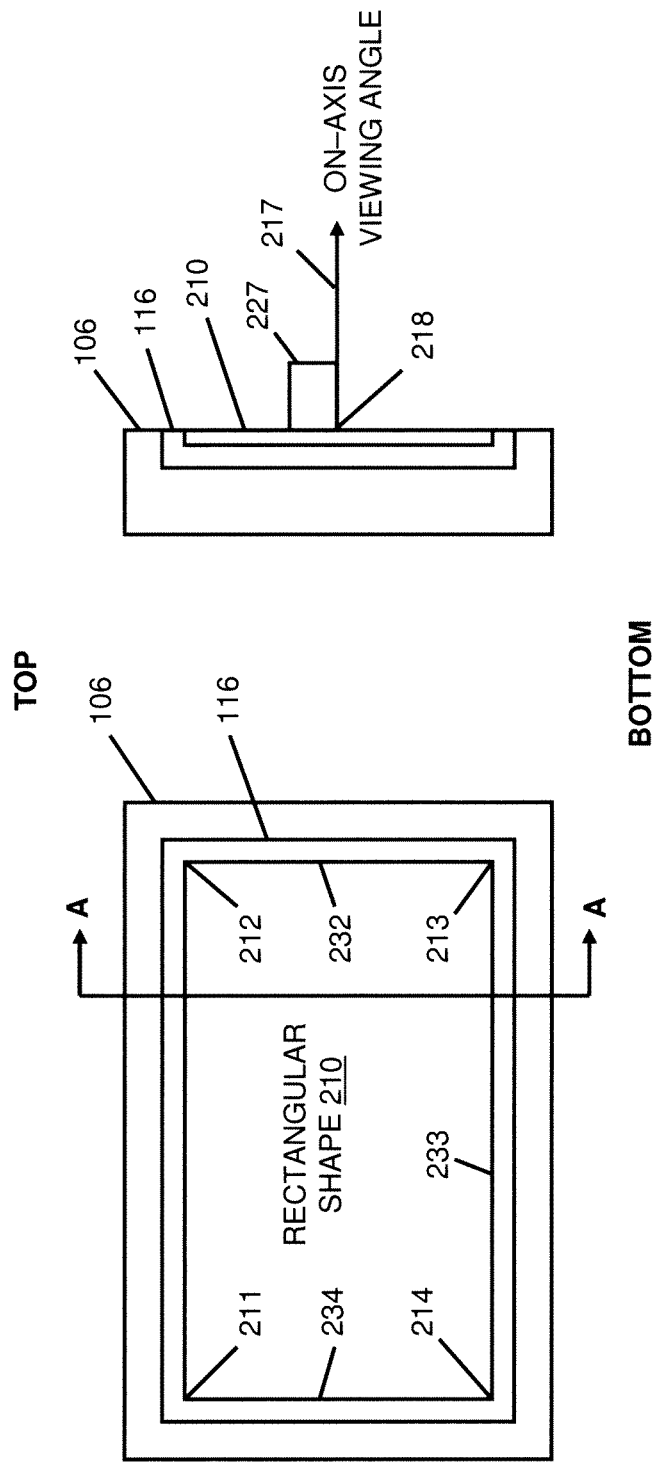

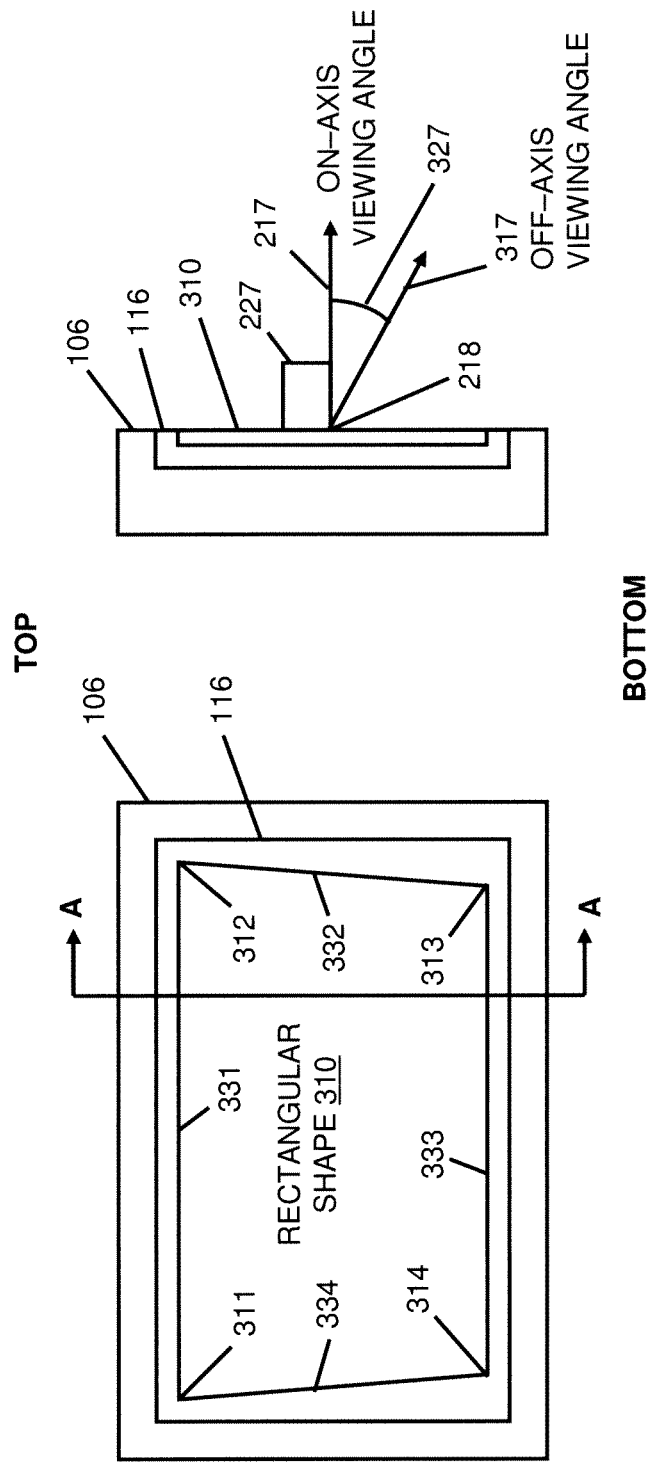

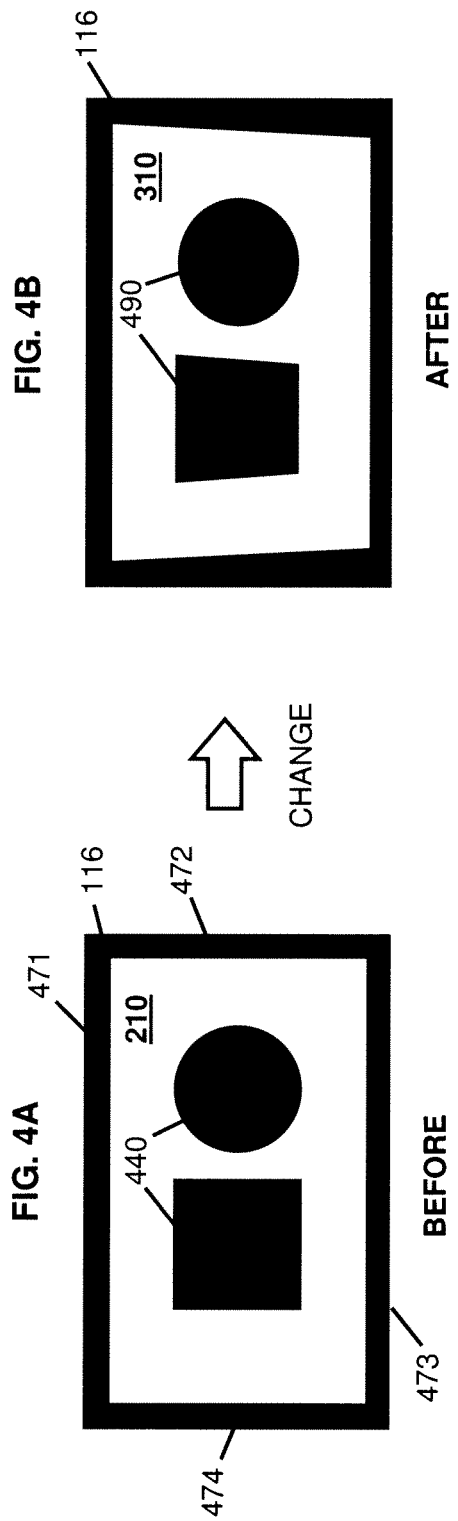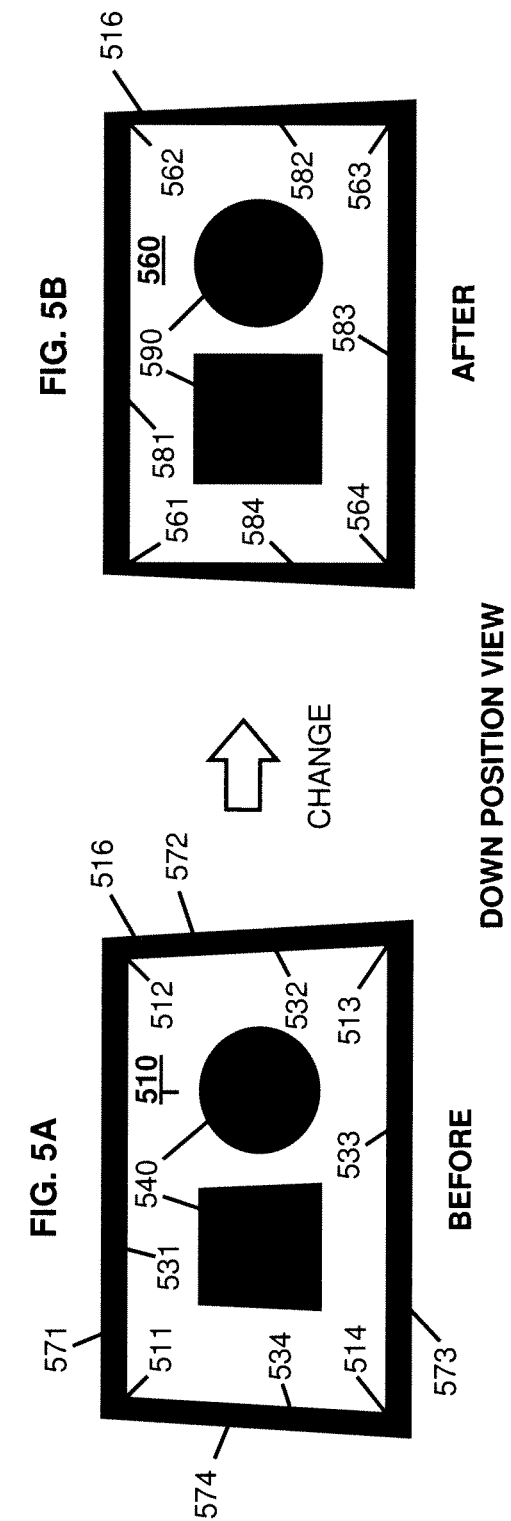

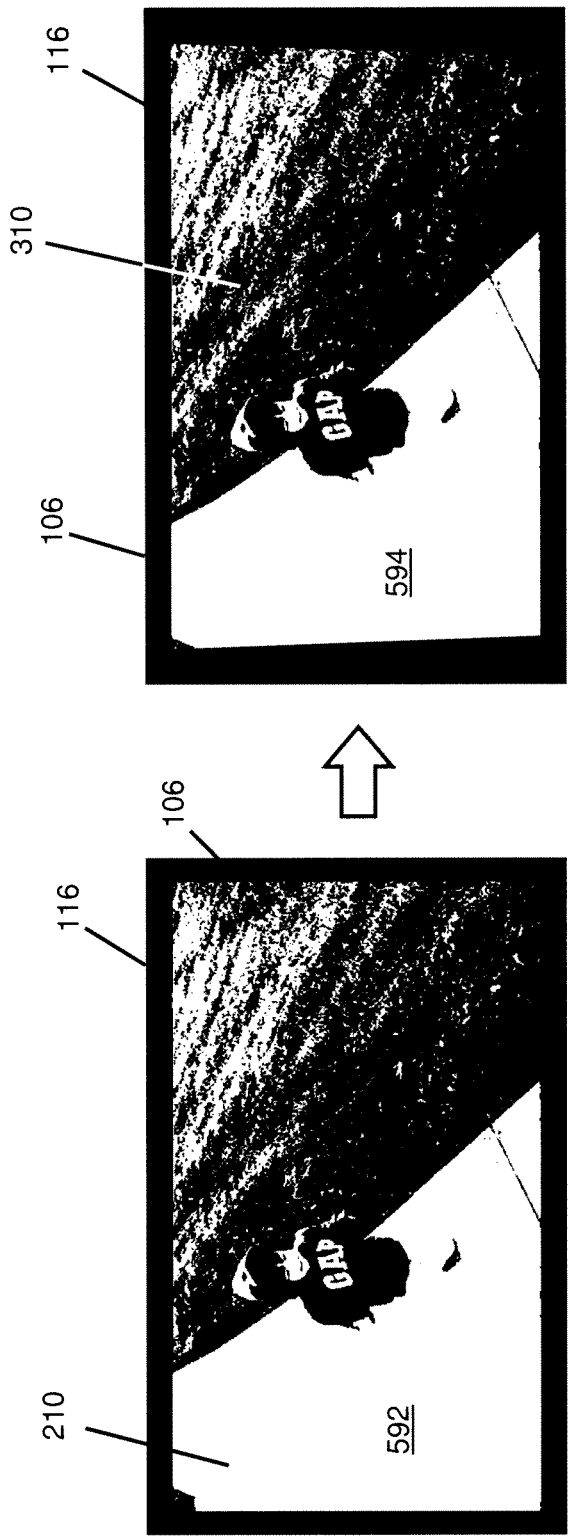

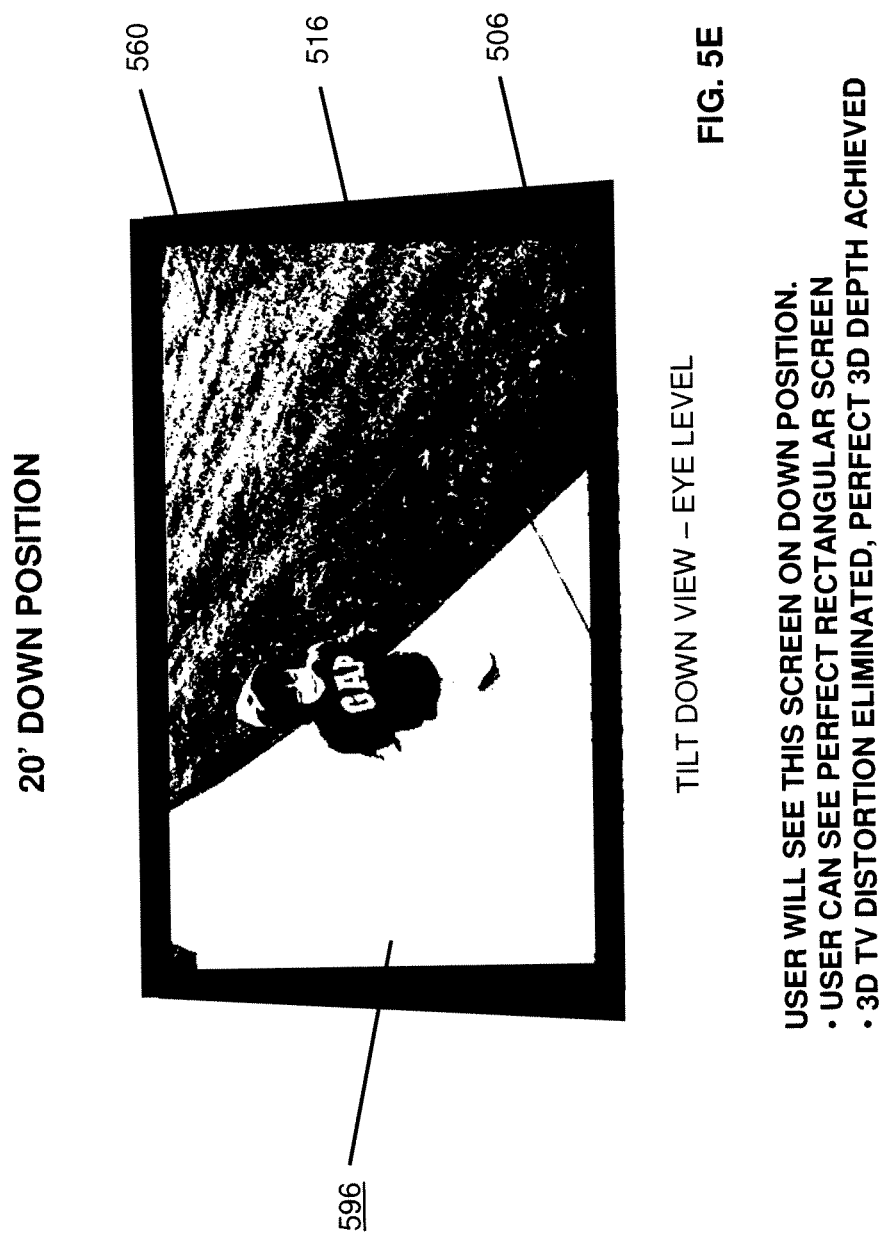

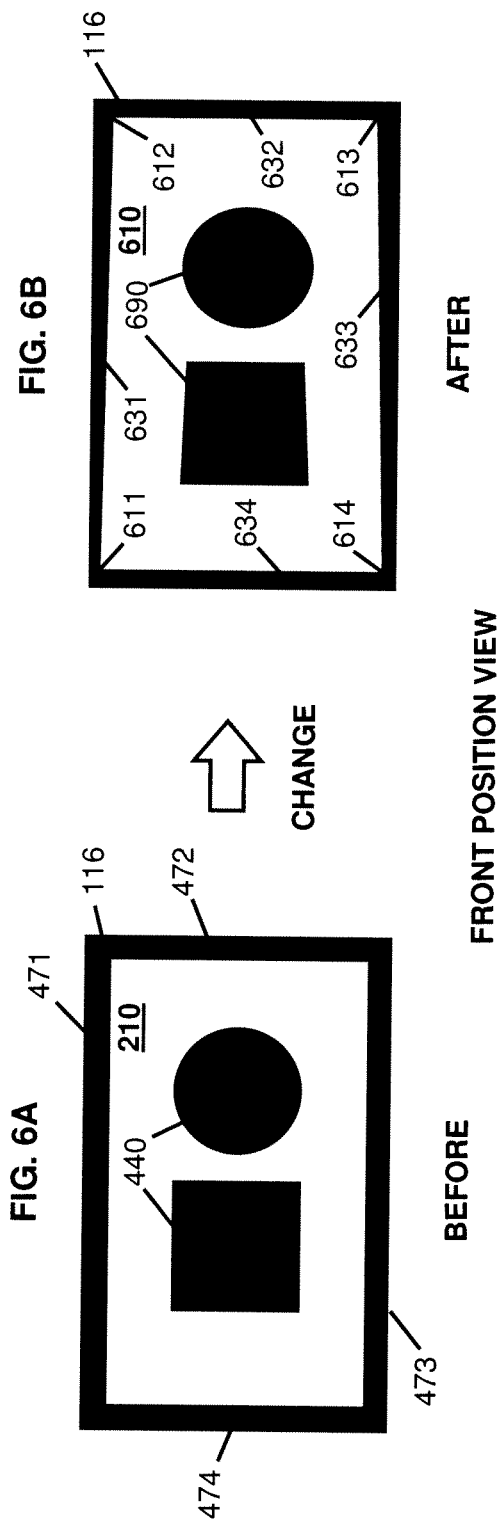
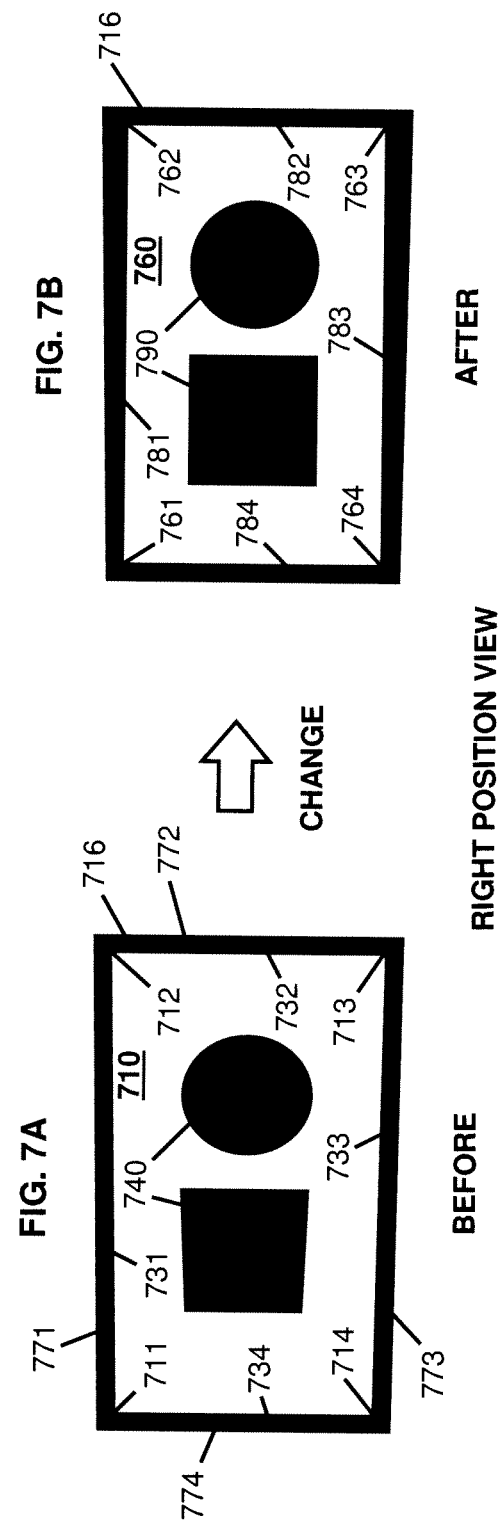

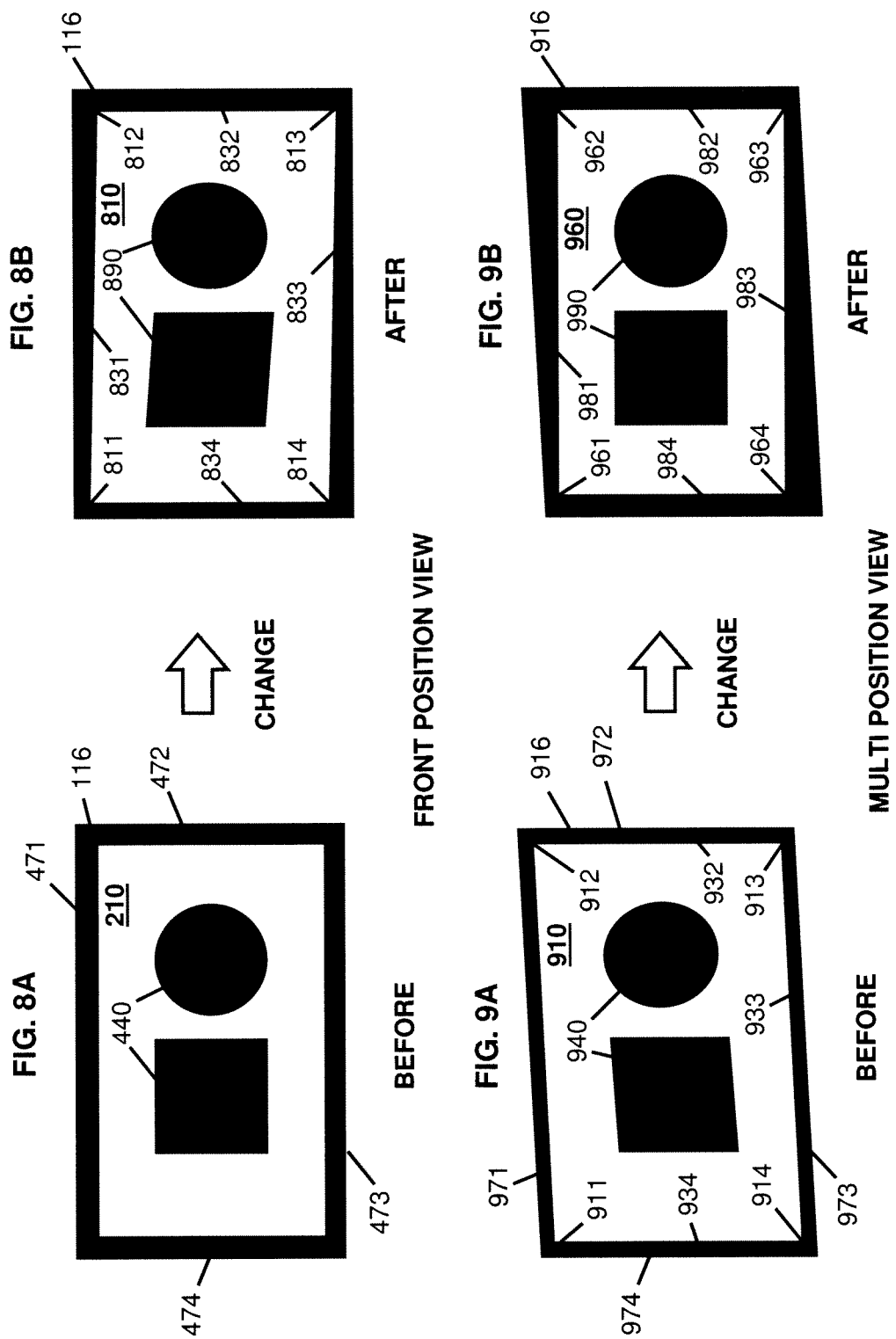

EX: TILT MULTI VIEW 10° RIGHT AND DOWN OFF-AXIS

EX: TILT DOWN VIEW 15° OFF-AXIS

EX: RIGHT VIEW 20° OFF-AXIS

ANY ONLINE TYPINE...

ONLINE GAME & APP STORE...

PORTAL SITE & SEARCHING...

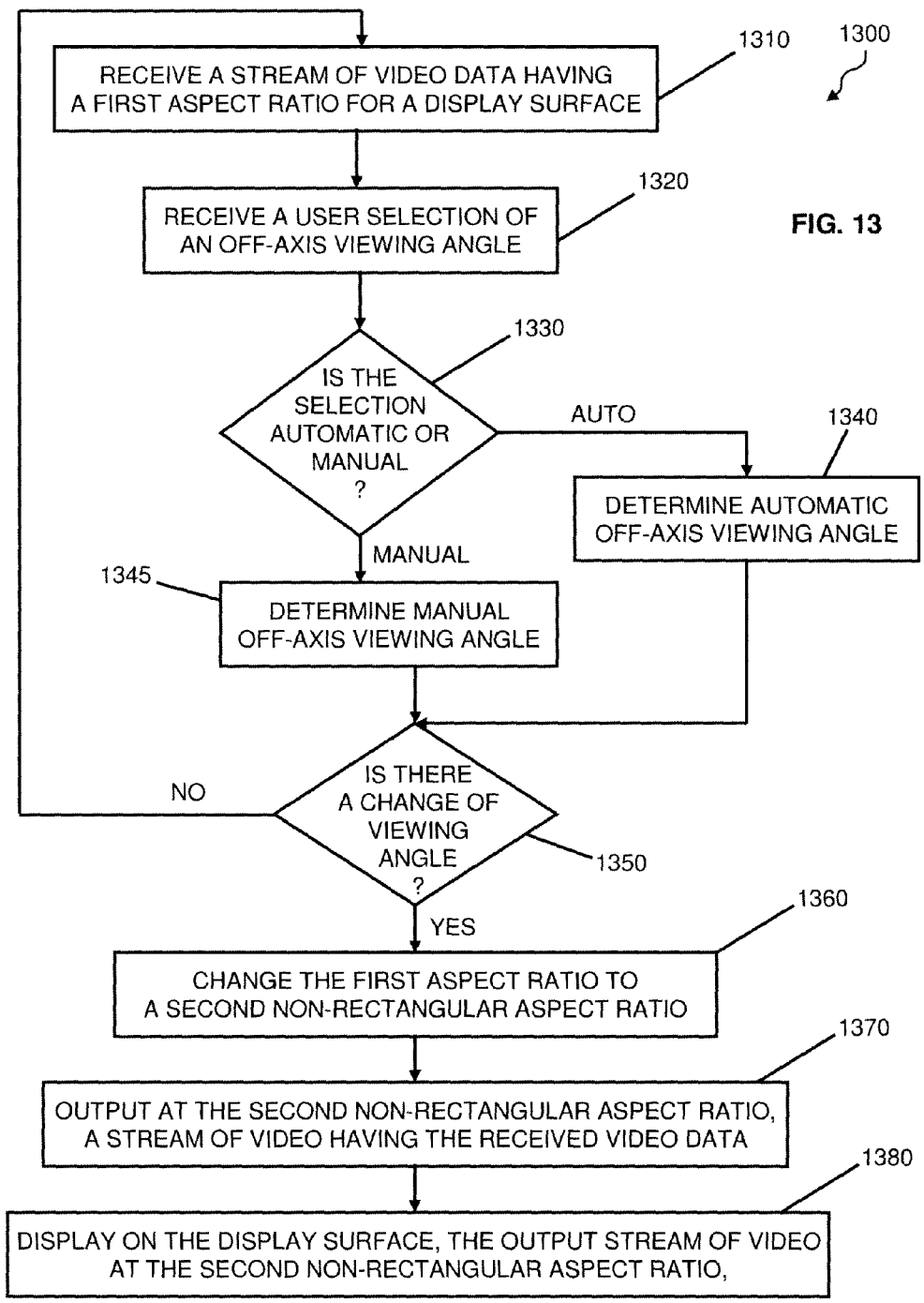

VIDEO DISPLAY CORRECTION TO PROVIDE ON-AXIS VIEW AT AN OFF-AXIS ANGLE

Embodiments of the invention are related to video display shape correction to provide viewing of a rectangular shaped aspect ratio, when a viewer is at an off-axis view angle with respect to a display surface of the video display. Other embodiments are also described.

BACKGROUND

Optimal viewing of a video display, such as a cathode ray tube (CRT), flat panel display, liquid crystal display (LCD), computer display, or other video or graphics display is usually from an on-axis view perpendicular to the image display surface of the display. For a flat or curved image surface, an on-axis view perpendicular to the center or midpoint of the display surface usually provides the optimal viewing angle. Such a viewing location or angle may be described, in short, as "on-axis" or "on-axis to the display surface."

One reason that such an on-axis view is optimal is because it provides a correct or rectangular shaped aspect ratio of the video displayed from the display surface. It also provides correctly shaped shapes in content or data of the displayed video from the display surface. Thus, on-axis viewing is beneficial for two-dimensional (2D) and three-dimensional (3D) displays and (TV). In addition, on-axis viewing provides optimal three-dimensional viewing for three-dimensional displays and TV's, such as resulting in increased perception of the third dimension of the images displayed with respect to the display surface (e.g. increased depth perception).

However, depending on where a display is located relative to a viewer or user, the location of a viewer may not necessarily be on-axis to the display surface. Instead, the view angle or view location may be "off-axis" with the display surface. Viewing the display from an off-axis view is not optimal because it does not provide a correct aspect ratio, correctly shaped shapes, and/or correct 3D effects.

SUMMARY

Embodiments describe methods, apparatus and systems to provide video display change or correction to provide an on-axis view at an off-axis angle so that the display surface displays a rectangular video image. For instance, a device may receive a stream of video data to be displayed on a display surface of a display, the video data having a first rectangular aspect ratio to be viewed from an on-axis location with respect to the display surface. The device may also receive a user selection of an off-axis viewing angle with respect to the display surface. The device may then change or correct the first rectangular aspect ratio to a second, non-rectangular aspect ratio based on the off-axis viewing angle, so that from the off-axis angle, the display surface appears to display a rectangular video image. Other embodiments are also described and claimed.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

FIGS. 2A-B shows an example of a display surface displaying a stream of video data at a rectangular aspect ratio, according to embodiments of the invention.

FIGS. 3A-B shows an example of a display surface displaying a stream of video data at a non-rectangular aspect ratio, according to embodiments of the invention.

FIGS. 4A-B show examples of a display surface displaying a stream of video data at an on-axis view, according to embodiments of the invention.

FIGS. 5A-B show examples of a display surface of FIGS. 4A-B displaying a stream of video data at an off-axis view, according to embodiments of the invention.

FIG. 5C shows on-axis view having an uncorrected rectangular video image correctly displayed on-axis, according to embodiments of the invention.

FIG. 5D shows on-axis view having a corrected non-rectangular video image incorrectly displayed on-axis, according to embodiments of the invention.

FIG. 5E shows off-axis view having a corrected video image correctly displayed off-axis, according to embodiments of the invention.

FIGS. 6A-B show examples of a display surface displaying a stream of video data at an on-axis view, according to embodiments of the invention.

FIGS. 7A-B show examples of a display surface of FIGS. 6A-B displaying a stream of video data at an off-axis view, according to embodiments of the invention.

FIGS. 8A-B show examples of a display surface displaying a stream of video data at an on-axis view, according to embodiments of the invention.

FIGS. 9A-B show examples of a display surface of FIGS. 8A-B displaying a stream of video data a combined or multi-off-axis view, according to embodiments of the invention.

FIG. 13 is an example of a flow diagram of video display correction to provide on-axis view, according to embodiments of the invention.

DETAILED DESCRIPTION

Several embodiments of the invention with reference to the appended drawings are now explained. Whenever the shapes, relative positions and other aspects of the parts described in the embodiments are not clearly defined, the scope of the invention is not limited only to the parts shown, which are meant merely for the purpose of illustration. Also, while numerous details are set forth, it is understood that some embodiments of the invention may be practiced without these details. In other instances, well-known circuits, electronic devices, software, structures, and techniques have not been shown in detail so as not to obscure the understanding of this description.

Depending on where a display is located relative to a viewer or user (e.g., person viewing video images displayed on the display surface), the location of a viewer (e.g., their eyes) may not necessarily be on-axis to the display surface. Instead, the view angle or view location may be "off-axis" with respect to an axis perpendicular to the center or midpoint of the display surface. Viewing the display from an off-axis view is not optimal because it does not provide a correct or rectangular shaped aspect ratio of the video displayed. It also does not provide correctly shaped shapes in content or data of the displayed video from the display surface (e.g., the shapes are stretched, distorted, or warped). Further, for 3D displays, images, viewing and/or technology, it also does not provide accurate 3D effects, such as where the depth perception or location of surfaces of shapes in content or data of the displayed video is not provided to a desired amount or desired uniformity of depth effects from the display surface. For instance, in order to achieve the full 3D experience one should sit directly in front of the TV, as 3D Technology is based on the depth of the image and one loses the true experience when moving away from on-axis viewing. Viewing 3D content from left or right angles views distorts the image causing poor viewing quality. Sitting off-axis will distort the image, not allowing the full 3D experience, as the depth of the content is not being viewed head on. Thus, it is desirable to provide a correction or adjustment for situations where the user is not on-axis with the display surface, in order to correct any or all of the above noted drawbacks. Embodiments described herein will allow a user the flexibility to move and adjust the image to obtain an on-axis view from an off-axis location, so the on-axis view is never lost.

Figure 1:
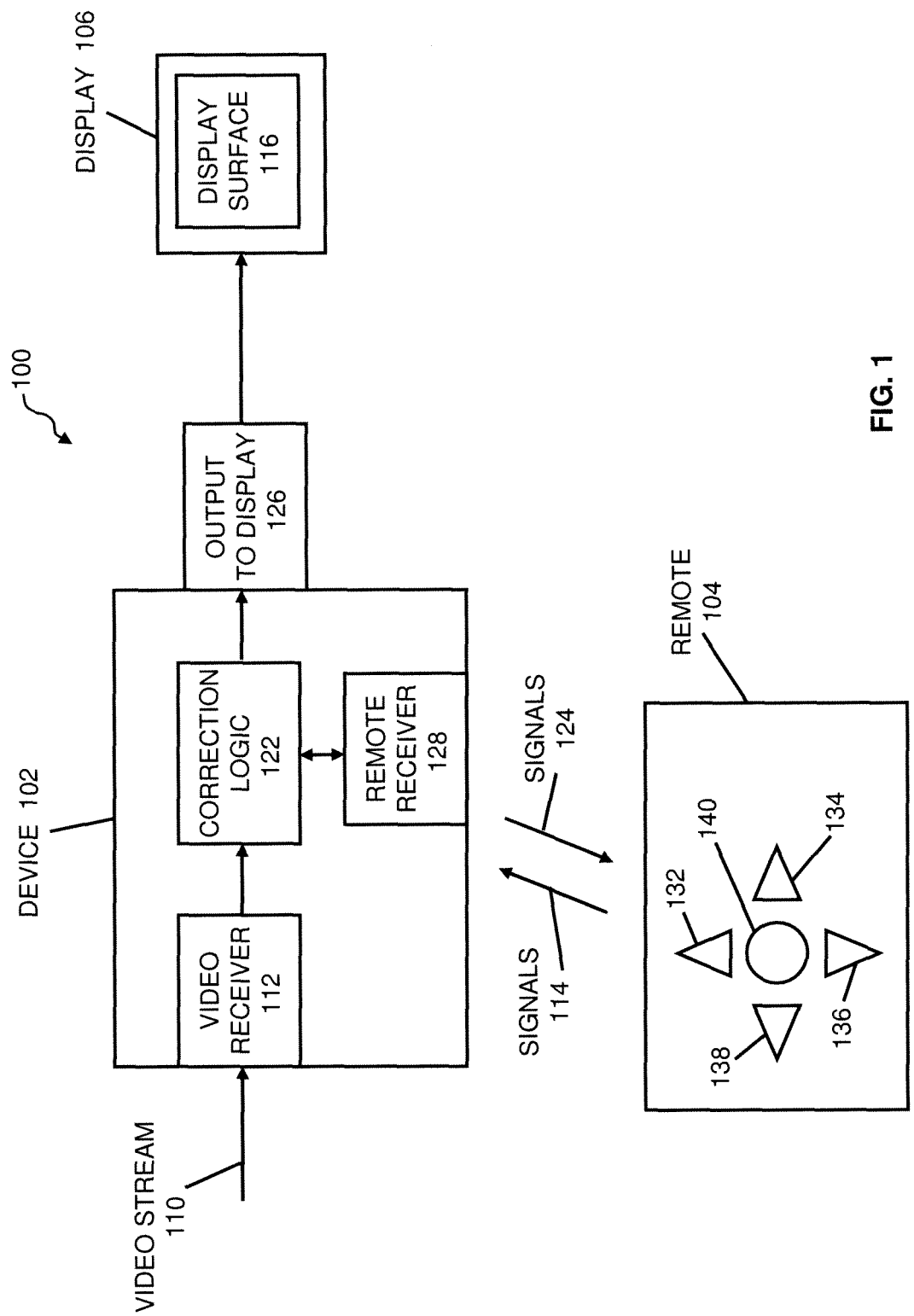
FIG. 1 is a block diagram of an example of an apparatus and/or system to provide video display correction to provide an on-axis view at an off-axis angle, according to embodiments of the invention.

FIG. 1 is a block diagram of an example of an apparatus and/or system to provide video display correction to provide an on-axis view at an off-axis angle, according to embodiments of the invention. FIG. 1 shows system 100 including device 102 receiving video stream 110 to be displayed on display 106. The video may be displayed on display surface 116 of display 106. System 100 may include an entertainment system, TV, high definition TV, 3D TV, computer, set-top box, cable box, satellite box, or other system having a video display as known in the art. Correspondingly, device 102 may include a TV, high definition TV, 3D TV, computer, set-top box, cable box, satellite box, or other video processing and/or display device as known in the art. However, system 100 and/or device 102 include special logic to provide video display correction (e.g., change of the aspect ratio, image and shapes of the displayed video, such as by moving or relocating the edges and sides of the video displayed) to provide an on-axis view at an off-axis angle.

Device 102 may include video receiver 112 to receive stream 110 of coded, compressed, uncompressed, or un-coded video. Stream 110 may include one or more audio tracks, video tracks, subtitles, and/or other data. Receiver 112 may include various decode, decompression, audio, video, subtitle and special logic as know in the industry.

System 100 also includes remote 104 for communicating with device 102. Remote 104 may provide control signals 114 to remote receiver 128 of device 102. Remote 104 and receiver 128 may be wired or wireless communication devices including wired or wireless communication capabilities known in the art for TV, audio component, and/or cable box wired or wireless communication devices. Receiver 128 may be coupled to logic 122. Receiver 128 may provide communication signals 124 from device 102 (e.g., feedback signals from logic 122 for locating remote 104) to remote 104. Remote 104 and receiver 128 are able to send wired or wireless communication signals between remote 104 and receiver 128, including signals identifying a user's off-axis angle (e.g., viewing position or location) by manual or remote user selection at remote 104. FIG. 1 shows remote 104 including buttons for up arrow 132, right arrow 134, down arrow 136, left arrow 138, and current position view (CPV) 140, such as to send signals to receiver 128 to cause logic 122 to identify a user's off-axis angle (e.g., based on selected arrow buttons or by locating an angle of remote 104 from display surface 116).

Device 102 includes correction logic 122 coupled between video receiver 112 and output to display 126, to correct the shape of frames of video received at receiver 112. The correction changes the shape of the frames to provide (e.g., in video output to output to display 126) an on-axis view from (e.g., by a user or viewer at) an off-axis angle, of the corrected frames of video when they are displayed on display surface 116 of display 106. Correction logic 122 is also coupled to remote receiver 128, such as to identifying a user's off-axis angle. Correction logic 122 may include various correction logic, correction software, video output buffers, scalers, render paths, display paths, audio, video, subtitle and special logic to provide an on-axis view at an off-axis angle as described herein.

In some case, correction logic 122 may provide an on-axis view to a user located at an off-axis angle, by correcting a received on-axis rectangular aspect ratio to be output as an on-axis non-rectangular aspect ratio based on an off-axis viewing angle (location or position) of a user. At the off-axis viewing angle, the correction (corrected output) causes the view to look like or be an on-axis view. For example, the correction causes the view at the off-axis viewing angle to have the same an on-axis rectangular aspect ratio of the original received signal (although possibly smaller due to the displayed non-rectangular aspect ratio shape having less area than the received on-axis rectangular aspect ratio).

Device 102 may include output to display 126 coupled to correction logic 122 to provide a video output signal to display on surface 116 of display 106. Output to display 126 may output video corrected to provide an on-axis view at an off-axis angle, to be displayed on display surface 116 of display 106. Output to display 126 may include various video output buffers, scalers, render paths, display paths, audio, video, subtitle and special logic as know in the industry. FIG. 1 will be described in further detail after describing in FIGS. 2-10 some concepts of correcting video to provide an on-axis view at an off-axis angle.

FIGS. 2A-B shows an example of a display surface displaying a stream of video data at a rectangular aspect ratio, according to embodiments of the invention. FIG. 2A shows the on-axis rectangular aspect ratio 210 (e.g., first aspect ratio) displayed on surface 116 of display 106. Rectangular aspect ratio 210 has corners (e.g., edges or edge points) 211, 212, 213 and 214; and has sides 231, 232, 233 and 234. FIG. 2B shows FIG. 2A through perspective A-A. FIG. 2B shows on-axis view (or angle) 217, perpendicular (e.g., at 90-degree angle 227) to the center or midpoint 218 of the display surface 116. For an on-axis view (angle or user location) each corner of aspect ratio 210 defines a 90-degree angle, and each pair of opposing sides has equal length.

FIGS. 3A-B shows an example of a display surface displaying a stream of video data at a non-rectangular rectangular aspect ratio, according to embodiments of the invention.

FIG. 3A shows the on-axis non-rectangular aspect ratio 310 (e.g., a second aspect ratio, different than the first) displayed on surface 116 of display 106. Non-rectangular aspect ratio 310 has corners (e.g., edges) 311, 312, 313 and 314; and has sides 331, 332, 333 and 334. FIG. 3B shows FIG. 3A through perspective A-A. FIG. 3B shows on-axis view (or angle) 217, perpendicular to the center or midpoint 218 of the display surface 116. FIG. 3B also shows off-axis view (or angle) 337 offset by angle 327 below or down from on-axis view 217 at the center or midpoint 218 of the display surface 116. For an on-axis view (angle or user location) each corner of aspect ratio 310 defines an angle that is not a 90-degree angle, and one pair of opposing sides is not equal in length. Corners 311 and 312 are shown having equal angles; and corners 313 and 314 are shown having equal angles, different than those of corners 311 and 312. Opposing sides 332 and 334 are shown having equal length; but opposing sides 331 and 333 are shown having different lengths.

However, aspect ratio 310 may provide an "on-axis" view from off-axis view (or angle) 337 (e.g., see FIG. 5B). Thus, aspect ratio 310 may be a correction or change to aspect ratio 210 (e.g., created or caused by logic 122) to provide an on-axis view to a user located at an off-axis angle, so that the user can view surface 116 at the off-axis viewing angle and see in the corrected output, video that looks on-axis. The correction causes the off-axis view to have the same an on-axis rectangular aspect ratio of the original received signal.

This correction may be described as calculating new positions on the display surface 116 for the corners of the corrected aspect ratio, such as to correct (e.g., move) the corners of video images displayed from locations of corners 211, 212, 213 and 214 to locations of corners 311, 312, 313 and 314. In some embodiments, calculations of the corrections to correct the corners for different off-axis view angles may be performed using known engineering mathematics and/or algorithms. In some cases, given an off-axis view angle and location of corners 211, 212, 213 and 214 on the display surface, known mathematical techniques can be used to calculate corrected locations for corners 311, 312, 313 and 314 on the display surface. These calculations may require knowing the off-axis view angle, but not require knowing the distance of the viewer from the display surface. Such calculations may include using geometry, Euclidean geometry, and/or trigonometry to calculate where the corrected corner locations. The corrections may be calculated using 2D mathematics; or 3D mathematics. In some embodiments, such calculations may include coordinate system conversions, such as between Polar (or Spherical) coordinates of the different off-axis view angles at the center of the display surface, and Cartesian coordinates of the corrected corner locations on the display surface for the different off-axis view angles.

In some cases, logic 122 may correct or change an on-axis rectangular shaped aspect ratio 210 of stream 110 into an on-axis non-rectangular (e.g., isosceles trapezoid) shaped aspect ratio 310. For a flat or curved image surface, an on-axis view or location 218 may be perpendicular to the center or midpoint 218 of the display surface. Thus, the rectangular shaped on-axis view 210 that would be displayed for video images of received stream 110 is "corrected" or "changed" by logic 122 to be non-rectangular shaped 310 from an on-axis view (angle or location) 217. The non-rectangular shaped 310 from an on-axis view may be called "corrected" or "changed" by logic 122 because it is rectangular shaped (e.g., looks like 210) when viewed from an off-axis view (angle or location) 317 (e.g., when a user or viewer is located or disposed at an off-axis view angle with respect to a display surface of the video display). In some embodiments, "correcting" or "changing" the video includes "moving", "distorting", "stretching" or "morphing" the sides or corners of rectangular shaped on-axis view 210 (as well as the video shapes and images within view 210) to new locations of non-rectangular shaped 310 from an on-axis view 217 (to new video shapes and images within view 310). In some cases, the off-axis angle 327 may correspond or be to a degree and direction of swivel or tilt that would be required to adjust the angle of the surface (e.g., and/or of vector 217) of display surface 116 to provide an on-axis view of display surface 116 from the off-axis angle view 317.

FIGS. 4A-B show examples of a display surface displaying a stream of video data at an on-axis view, according to embodiments of the invention. FIGS. 4A and B correspond to FIGS. 2A and 3A respectively, but include shapes 440 and 490. FIG. 4A shows shapes 440 (e.g., a circle and square) included in video data displayed in content or data of the displayed video within aspect ratio 210. It can be appreciated that from on-axis view (or angle) 217, aspect ratio 210 provides a rectangular (e.g., correct for the received video stream) shaped aspect ratio of the video displayed from the display surface. It also provides correctly shaped shapes 440 in content or data of the displayed video within aspect ratio 210.

FIG. 4B shows shapes 490 (e.g., a vertically stretched or distorted circle and square) included in video data displayed in content or data of the displayed video within aspect ratio 310. From on-axis view 217, aspect ratio 310 provides an incorrect or non-rectangular shaped aspect ratio of the video displayed from the display surface. Also, aspect ratio 310 provides incorrectly shaped shapes 490 in content or data of the displayed video within aspect ratio 210. Moreover, aspect ratio 310 provides inaccurate 3D effects (e.g., depth perception) in content or data of the displayed video within aspect ratio 210. FIGS. 4A-B show display surface 116 having sides 471, 472, 473 and 474. Each pair of opposing sides has equal length.

FIGS. 5A-B show examples of the display surface of FIGS. 4A-B displaying a stream of video data at an off-axis view, according to embodiments of the invention. FIGS. 5A-B show aspect ratios 210 and 310 FIGS. 4A-B from downwards off-axis view (or angle) 337 offset by angle 327 from (e.g., below) on-axis view 217 at the center or midpoint 218 of the display surface 116. The off-axis view of aspect ratios 210 and 310 (and of display surface 116) is different in FIGS. 5A-B, relative to the on-axis view of FIGS. 4A-B, due to the change in viewing angle.

Specifically, the off-axis view of aspect ratios 210 and 310 (and of display surface 116) of FIGS. 4A-B is represented as aspect ratios 510 and 560 (and of display surface 516) in FIGS. 5A-B. Similarly, the off-axis view of shapes 440 and 490 of FIGS. 4A-B are represented as shapes 540 and 590 in FIGS. 5A-B. It can be appreciated, that from an off-axis view 317, on-axis rectangular aspect ratio 210 looks larger on the bottom, as aspect ratio 510. Similarly, from an off-axis view 317, rectangular display surface 116 looks larger on the bottom, as display surface 516. However, from off-axis view 317, on-axis non-rectangular aspect ratio 310 looks rectangular, as aspect ratio 560. That is, from off-axis view 317, aspect ratio 560 may have the same rectangular shape as (but possibly a little smaller than) aspect ratio 210 from on-axis view 217.

The off-axis view of sides 471, 472, 473 and 474 of display surface 116 of FIGS. 4A-B are represented as sides 571, 572, 573 and 574 of display surface 516 in FIGS. 5A-B. The off-axis view of corners 211, 212, 213 and 214 of aspect ratio 210 is represented as corners 511, 512, 513 and 514 of aspect ratio 510 in FIG. 5A. The off-axis view of sides 231, 232, 233 and 234 of aspect ratio 210 is represented as sides 531, 532, 533 and 534 of aspect ratio 510 in FIG. 5A. The off-axis view of corners 311, 312, 313 and 314 of aspect ratio 310 is represented as corners 561, 562, 563 and 564 of aspect ratio 510 in FIG. 5B. The off-axis view of sides 331, 332, 333 and 334 of aspect ratio 310 is represented as sides 581, 582, 583 and 584 of aspect ratio 560 in FIG. 5B.

Opposing sides 572 and 574 are shown having equal length; but opposing sides 571 and 573 are shown having different lengths. For the off-axis view (angle or user location) of FIG. 5A, each corner of aspect ratio 510 defines an angle that is not a 90-degree angle, and one pair of opposing sides that is not equal in length.

However, for the off-axis view (angle or user location) of FIG. 5B, each corner of aspect ratio 560 defines an angle that is a 90-degree angle, and each pair of opposing sides are equal in length. Although aspect ratio 560 may be incorrect and have incorrect shapes from an on-axis view of FIG. 4B, it may be considered "correct" or "corrected" from the off-axis view of FIG. 5B since it shows a correct aspect ratio and shapes from the off-axis view. Thus, although, from on-axis view 217, aspect ratio 310 of FIG. 4B provides an incorrect or non-rectangular shaped aspect ratio of the video displayed from the display surface, aspect ratio 310 provides the advantage of being corrected off-axis view aspect ratio 560 of FIG. 5B. Also, although aspect ratio 310 provides incorrectly shaped shapes 490 from on-axis view 217, aspect ratio 310 provides the advantage including corrected off-axis shaped shapes 590 of FIG. 5B. Moreover, although aspect ratio 310 provides inaccurate 3D effects for shapes 490 from on-axis view 217, aspect ratio 310 provides the advantage including corrected 3D effects for off-axis shaped shapes 590 of FIG. 5B.

Thus, corrected non-rectangular aspect ratio 310 with respect to the surface of the display is rectangular aspect ratio 560 with respect to the off-axis viewing angle 317, based on, according to, and/or calculated from the off-axis viewing angle 317. Changing ratio 210 (e.g., to display corrected non-rectangular aspect ratio 310) allows rectangular aspect ratio 560 to be viewed from off-axis viewing angle 317 without physically moving, tilting, swiveling, or reorienting the display surface of the display.

Figure 5F:
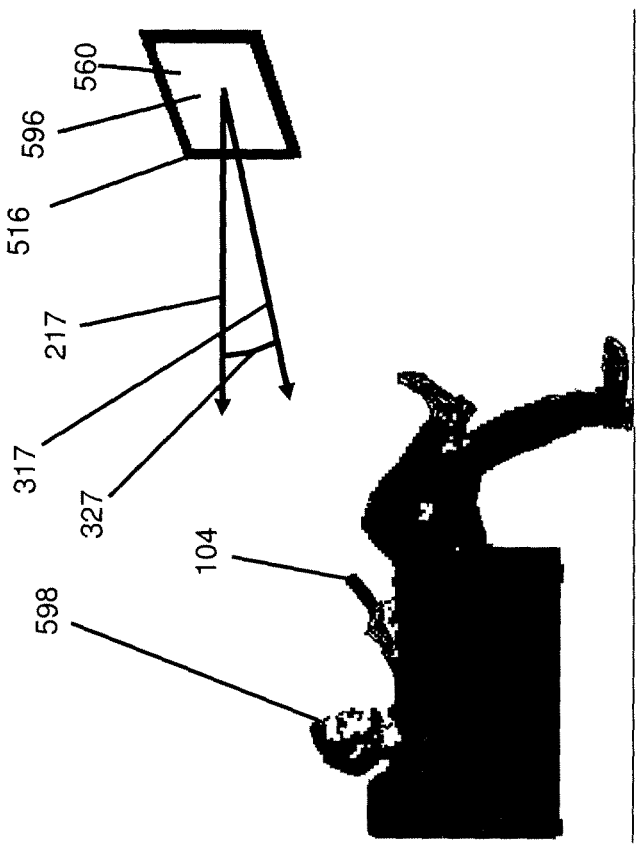
FIG. 5F shows a user at an off-axis view of an aspect ratio that correctly displays a corrected video image, according to embodiments of the invention.

For instance, FIG. 5C shows on-axis view (e.g., FIG. 4A) having uncorrected rectangular video image 592 correctly displayed in aspect ratio 210 on surface 116 of display 106. Next, FIG. 5D shows on-axis view (e.g., FIG. 4B) having corrected non-rectangular video image 594 incorrectly displayed in aspect ratio 310 on surface 116 of display 106. Notably, FIG. 5E shows off-axis view (e.g., FIG. 5B) having corrected video image 592 correctly displayed in aspect ratio 560 on off-axis surface 516 of off-axis display 506. Thus, for user 598 shown in FIG. 5F, at off-axis view 317 (e.g., at angle 327 (e.g., 20 degrees) down from on-axis view 217), aspect ratio 560 (e.g., FIG. 5B) correctly displays corrected video image 592 on off-axis surface 516 of off-axis display 506, in a rectangle and with correct aspect ration, shapes and 3D effects. Rectangular aspect ratio 560 and image 592 may be viewed from off-axis viewing angle 317 without physically moving, tilting, swiveling, or reorienting the display surface 116 or 516 (depending on the view) of the display.

The same concepts described above for FIGS. 2-5, for off-axis view angles below or down from on-axis view 217, can apply to off-axis view angles above or over on-axis view 217. These down and up angles may be described as a tilt angle. Similarly, the same concepts described above for FIGS. 2-5, for off-axis view angles below or down from on-axis view 217, can apply to off-axis view angles left of or on the left of on-axis view 217. Also, the same concepts described above for FIGS. 2-5, for off-axis view angles below or down from on-axis view 217, can apply to off-axis view angles right of or on the right of on-axis view 217. These left and right angle may be described as swivel angles.

In fact, the same concepts described above for FIGS. 2-5, for off-axis view angles below or down from on-axis view 217, can apply to combined or multi-position off-axis view angles that have a combination of two off-axis view angles from on-axis view 217. For instance, combined or multi-position off-axis view angle may be below and left; below and right; above and left; or above and right from on-axis view 217. These combined angles may be described as tilt and swivel angles.

FIGS. 6A-B show examples of a display surface displaying a stream of video data at an on-axis view, according to embodiments of the invention. FIGS. 6A and B correspond to FIGS. 4A and 5B respectively, but FIG. 6B is for off-axis view angles (e.g., such as by and angle equal to angle 317) right of (or on the right of) on-axis view 217.

FIG. 6B shows the on-axis non-rectangular aspect ratio 610 (e.g., isosceles trapezoid). Non-rectangular aspect ratio 610 has corners (e.g., edges) 611, 612, 613 and 614; and has sides 631, 632, 633 and 634. FIG. 6B may be similar to FIG. 3B but shows off-axis view (or angle) 337 offset by angle 327 right of or on the right from on-axis view 217. For an on-axis view (angle or user location) each corner of aspect ratio 610 defines an angle that is not a 90-degree angle, and one pair of opposing sides is not equal in length. Corners 611 and 614 are shown having equal angles; and corners 612 and 613 are shown having equal angles, different than those of corners 611 and 614. Opposing sides 621 and 623 are shown having equal length; but opposing sides 622 and 624 are shown having different lengths.

FIG. 6B shows shapes 690 (e.g., a horizontally stretched or distorted circle and square) included in video data displayed in content or data of the displayed video within aspect ratio 610. From on-axis view 217, aspect ratio 610 provides an incorrect or non-rectangular shaped aspect ratio of the video displayed from the display surface. Also, aspect ratio 610 provides incorrectly shaped shapes 690 in content or data of the displayed video within aspect ratio 210.

However, aspect ratio 610 may provide an "on-axis" view from the off-axis view (e.g., see FIG. 7B). Thus, aspect ratio 610 may be a correction or change to aspect ratio 210 (e.g., created or caused by logic 122) to provide an on-axis view, such as noted above for aspect ratios 310 and 560.

FIGS. 7A-B show examples of a display surface of FIGS. 6A-B displaying a stream of video data at an off-axis view, according to embodiments of the invention. FIGS. 7A-B show aspect ratios 210 and 610 FIGS. 6A-B from right of (e.g., by an angle equal to off-axis view (or angle) 337 offset by angle 327) on-axis view 217 at the center or midpoint 218 of the display surface 116.

Specifically, the off-axis view of aspect ratios 210 and 610 (and of display surface 116) of FIGS. 6A-B is represented as aspect ratios 710 and 760 (and of display surface 716) in FIGS. 7A-B. Similarly, the off-axis view of shapes 640 and 690 of FIGS. 6A-B are represented as shapes 740 and 790 in FIGS. 7A-B. It can be appreciated, that from the (to the right) off-axis view, on-axis rectangular aspect ratio 210 looks larger on the right, as aspect ratio 710. Similarly, from the (to the right) off-axis view, rectangular display surface 116 looks larger on the right as display surface 716. However, from the (to the right) off-axis view, on-axis non-rectangular aspect ratio 610 looks rectangular, as aspect ratio 760. That is, from the to the right off-axis view, aspect ratio 760 may have the same rectangular shape as (but possibly a little smaller than) aspect ratio 210 from on-axis view 217.

The off-axis view of sides 471, 472, 473 and 474 of display surface 116 of FIGS. 6A-B are represented as sides 771, 772, 773 and 774 of display surface 716 in FIGS. 7A-B. The off-axis view of corners 211, 212, 213 and 214 of aspect ratio 210 is represented as corners 711, 712, 713 and 714 of aspect ratio 710 in FIG. 7A. The off-axis view of sides 231, 232, 233 and 234 of aspect ratio 210 is represented as sides 731, 732, 733 and 734 of aspect ratio 710 in FIG. 7A. The off-axis view of corners 611, 612, 613 and 614 of aspect ratio 610 is represented as corners 761, 762, 763 and 764 of aspect ratio 710 in FIG. 7B. The off-axis view of sides 631, 632, 633 and 634 of aspect ratio 610 is represented as sides 781, 782, 783 and 784 of aspect ratio 760 in FIG. 7B. Opposing sides 771 and 773 are shown having equal length; but opposing sides 772 and 774 are shown having different lengths. For the off-axis view (angle or user location) of FIG. 7A, each corner of aspect ratio 710 defines an angle that is not a 90-degree angle, and one pair of opposing sides that is not equal in length.

However, for the off-axis view (angle or user location) of FIG. 7B, each corner of aspect ratio 760 defines an angle that is a 90-degree angle, and each pair of opposing sides are equal in length. Although aspect ratio 760 may be incorrect and have incorrect shapes from an on-axis view of FIG. 6B, it may be considered "correct" or "corrected" from the off-axis view of FIG. 7B since it shows a correct aspect ratio and shapes from the off-axis view. Thus, although, from on-axis view 217, aspect ratio 610 of FIG. 6B provides an incorrect or non-rectangular shaped aspect ratio of the video displayed from the display surface, aspect ratio 610 provides the advantage of being corrected off-axis view aspect ratio 760 of FIG. 7B. Also, although aspect ratio 610 provides incorrectly shaped shapes 690 from on-axis view 217, aspect ratio 610 provides the advantage including corrected off-axis shaped shapes 790 of FIG. 7B. Moreover, although aspect ratio 610 provides inaccurate 3D effects for shapes 690 from on-axis view 217, aspect ratio 610 provides the advantage including corrected 3D effects for off-axis shaped shapes 790 of FIG. 7B.

As noted above, the same concepts described above for FIGS. 2-5, for off-axis view angles below or down from on-axis view 217, can apply to combined or multi-position off-axis view angles. FIGS. 8A-B show examples of a display surface displaying a stream of video data at an on-axis view, according to embodiments of the invention. FIG. 8A corresponds to FIG. 4A. FIG. 8B correspond to a combination of FIGS. 4B and 6B, but FIG. 8B is for combined or multi-off-axis view angles (e.g., such as by and angle equal to angle 317) right of and below on-axis view 217.

FIG. 8B shows the on-axis non-rectangular aspect ratio 810 (e.g., non-isosceles trapezoid). Aspect ratio 810 may look stretched largest at the edge(s) away from the viewer. e.g., like a kite. Non-rectangular aspect ratio 810 has corners (e.g., edges) 811, 812, 813 and 814; and has sides 831, 832, 833 and 834. FIG. 8B may be similar to a combination of FIGS. 4B and 6B but shows off-axis view (or angle) 337 offset by angle 327 right of and below on-axis view 217. For an on-axis view (angle or user location) each corner of aspect ratio 810 defines an angle that may not be a 90-degree angle, and opposing sides that may not be equal in length. Depending on the offset angle (e.g., off-axis view), it is possible that some angles may be 90 degrees; and that some opposing sides may be equal in length. In FIG. 8 we will use an offset angle is such that none of the angles are 90 degrees; and that none of the opposing sides are equal in length.

FIG. 8B shows shapes 890 (e.g., a vertically and horizontally stretched or distorted circle and square) included in video data displayed in content or data of the displayed video within aspect ratio 810. From on-axis view 217, aspect ratio 810 provides an incorrect or non-rectangular shaped aspect ratio of the video displayed from the display surface. Also, aspect ratio 810 provides incorrectly shaped shapes 890 in content or data of the displayed video within aspect ratio 210.

However, aspect ratio 810 may provide an "on-axis" view from the off-axis view (e.g., see FIG. 9B). Thus, aspect ratio 810 may be a correction or change to aspect ratio 210 (e.g., created or caused by logic 122) to provide an on-axis view, such as noted above for a combination of aspect ratios 560 and 760 (e.g., for a combined or multi-off-axis view angles).

FIGS. 9A-B show examples of a display surface of FIGS. 9A-B displaying a stream of video data at a combined or multi-off-axis view, according to embodiments of the invention. FIGS. 9A-B show aspect ratios 210 and 810 FIGS. 8A-B from right of and below (e.g., by an angle equal to off-axis view (or angle) 337 offset by angle 327) on-axis view 217 at the center or midpoint 218 of the display surface 116.

Specifically, the off-axis view of aspect ratios 210 and 810 (and of display surface 116) of FIGS. 8A-B is represented as aspect ratios 910 and 960 (and of display surface 916) in FIGS. 9A-B. Similarly, the off-axis view of shapes 840 and 890 of FIGS. 8A-B are represented as shapes 940 and 990 in FIGS. 9A-B. It can be appreciated, that from the to the right and below off-axis view, on-axis rectangular aspect ratio 210 looks larger on the right and bottom, as aspect ratio 910. Similarly, from the to the right and below off-axis view, rectangular display surface 116 looks larger on the right as display surface 916. However, from the to the right and below off-axis view, on-axis non-rectangular aspect ratio 810 looks rectangular, as aspect ratio 960. That is, from the to the right off-axis view, aspect ratio 960 may have the same rectangular shape as (but possibly a little smaller than) aspect ratio 210 from on-axis view 217.

The off-axis view of sides 471, 472, 473 and 474 of display surface 116 of FIGS. 8A-B are represented as sides 971, 972, 973 and 974 of display surface 916 in FIGS. 9A-B. The off-axis view of corners 211, 212, 213 and 214 of aspect ratio 210 is represented as corners 911, 912, 913 and 914 of aspect ratio 910 in FIG. 9A. The off-axis view of sides 231, 232, 233 and 234 of aspect ratio 210 is represented as sides 931, 932, 933 and 934 of aspect ratio 910 in FIG. 9A. The off-axis view of corners 811, 812, 813 and 814 of aspect ratio 810 is represented as corners 961, 962, 963 and 964 of aspect ratio 910 in FIG. 9B. The off-axis view of sides 831, 832, 833 and 834 of aspect ratio 810 is represented as sides 981, 982, 983 and 984 of aspect ratio 960 in FIG. 9B. Opposing sides 771 and 773 are shown having different lengths; and opposing sides 772 and 774 are shown having different lengths. For the off-axis view (angle or user location) of FIG. 9A, each corner of aspect ratio 710 defines an angle that is not a 90-degree angle, and none of the pair of opposing sides are equal in length.

However, for the off-axis view (angle or user location) of FIG. 9B, each corner of aspect ratio 960 defines an angle that is a 90-degree angle, and each pair of opposing sides are equal in length. Although aspect ratio 960 may be incorrect and have incorrect shapes from an on-axis view of FIG. 8B, it may be considered "correct" or "corrected" from the off-axis view of FIG. 9B since it shows a correct aspect ratio and shapes from the off-axis view. Thus, although, from on-axis view 217, aspect ratio 810 of FIG. 8B provides an incorrect or non-rectangular shaped aspect ratio of the video displayed from the display surface, aspect ratio 810 provides the advantage of being corrected off-axis view aspect ratio 960 of FIG. 9B. Also, although aspect ratio 810 provides incorrectly shaped shapes 890 from on-axis view 217, aspect ratio 810 provides the advantage including corrected off-axis shaped shapes 990 of FIG. 9B. Moreover, although aspect ratio 810 provides inaccurate 3D effects for shapes 890 from on-axis view 217, aspect ratio 810 provides the advantage including corrected 3D effects for off-axis shaped shapes 990 of FIG. 9B.

In some cases the combined (or multi-off-axis) view angle correction (e.g., FIG. 9B) may be an aggregate of the two corrections for each of the off-axis angles of FIGS. 4B and 6B. Thus, the correction may be a correction for off-axis view angle 327 right of on-axis view 217, added to a correction for off-axis view angle 327 below on-axis view 217. It is contemplated that angle 327 right and angle 327 below may be different angular amounts. Moreover, embodiments contemplate combined (or multi-off-axis) view angle corrections for other combinations of two corrections for each of the off-axis angle.

According to embodiments, the corrections described herein may apply to various off-axis angles and ranges of angles. For instance, angle 317 for left, right, up, down (e.g., FIGS. 2-7), or combined (or multi-off-axis) view angles (e.g., FIGS. 8-9), may be in a range of between 0 and 90 degrees; 0 and 45 degrees; or 0 and 25 degrees. In some case it may be between 5 and 20 degrees. For some embodiments, it may be in quantized increments of degrees, such as in 1, 2, 3, or 5 degree increments between any of these ranges. In some cases it may be selected only from the range of 5, 10, 15, and 20 degrees. It can be calculated what these ranges provide for combined (or multi-off-axis) view angles (e.g., FIGS. 8-9).

In some embodiments, displaying the stream of video data on the display surface at the second, non-rectangular aspect ratio includes displaying a status bar (e.g., image) on the display indicating the off-axis view angle selected. For instance, the corrected view of the video image (e.g., non-rectangular from on-axis view but rectangular from off-axis view) may be overlaid or interrupted to show a correction status bar showing the current view angle, such as to show a current off-axis angle. The off-axis angle (e.g., angle 327) may correspond or be to a degree and direction of swivel or tilt that would be required to adjust the angle of the surface (e.g., and/or of vector 217) of display surface 116 to provide an on-axis view of display surface 116 from the off-axis angle view 317.

In some embodiments, displaying the a status bar includes displaying a status image indicating a current aspect ratio with respect to the surface of the display, and available range of non-rectangular aspect ratios with respect tot the surface of the display. If a user selection is received changing the current aspect ratio, then the status bar display may be updated to indicate a changed to angle, and to display a new aspect ratio with respect to the surface of the display upon receiving the user selection. The status bar may be a complete overlay, watermark or semitransparent overlay over the display of the stream of video data.

Figure 10C:
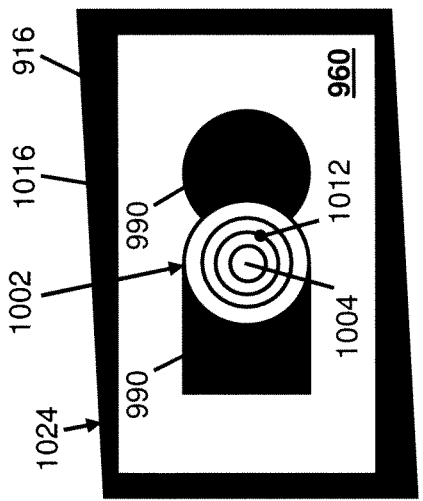
FIGS. 10A-C shows off-axis views having a correction status bar showing current off-axis view angles, according to embodiments of the invention.
Figure 10B:
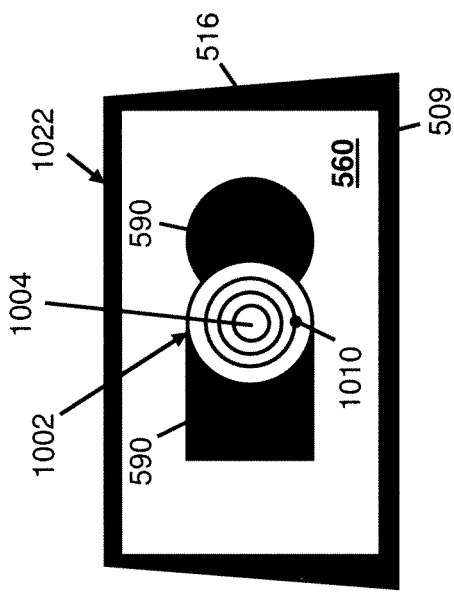
Figure 10A:
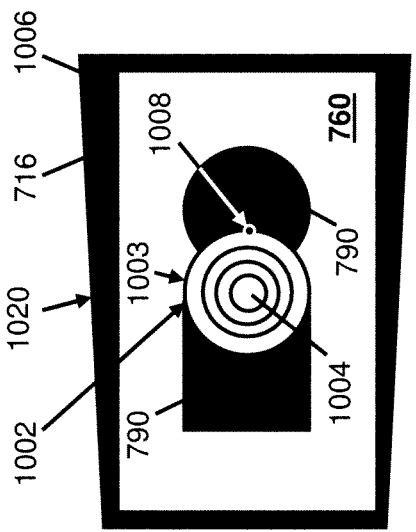

For example, FIG. 10A shows off-axis view 1020 (e.g., of FIG. 7B) having correction status bar 1002, having concentric circles showing the available on-axis view or angle range 1003 (in this case showing a range from 0-20 degrees in any X-Y direction, adjustable at 5 degree increments) and showing the current view angle 1008 from on-axis view or angle 1004. Current view angle 1008 may indicate or identify the current off-axis angle (e.g., angle 317 and or view 327, to the right of on-axis) such as received or identified from the user or remote. Thus, a line drawn from view 1004, through angle 1008 points towards the user, such as at the current off-axis angle. FIG. 10A shows the correction status bar 1002 showing the current view angle 1008, overlaying (e.g., as a watermark or semitransparent overlay over) corrected aspect ratio 760 having shapes 790 correctly displayed off-axis on surface 716 of display 1006.

Similarly, FIG. 10B shows off-axis view 1022 (e.g., of FIG. 5B) having correction status bar 1002 showing the current view angle 1010 from on-axis view or angle 1004. Current view angle 1010 may indicate or identify the current off-axis angle (e.g., angle 317 and or view 327, below on-axis) such as received or identified from the user or remote. Thus, a line drawn from view 1004, through angle 1010 points towards the user, such as at the current off-axis angle. FIG. 10A shows the correction status bar 1002 showing the current view angle 1018, overlaying corrected aspect ratio 560 having shapes 590 correctly displayed off-axis on surface 516 of display 506.

Next, FIG. 10C shows off-axis view 1024 (e.g., of FIG. 9B) having correction status bar 1002 showing the current combined or multi-view angle 1012 from on-axis view or angle 1004. Current view angle 1012 may indicate or identify the current off-axis angle (e.g., angle 317 and or view 327, to the right and below on-axis) such as received or identified from the user or remote. Thus, a line drawn from view 1004, through angle 1012 points towards the user, such as at the current off-axis angle. FIG. 10A shows the correction status bar 1002 showing the current view angle 1012, overlaying corrected aspect ratio 960 having shapes 990 correctly displayed off-axis on surface 916 of display 1016.

One benefit of having correction status bar 1002 able to show the current view angles (e.g., 1008, 1010 and/or 1012) is showing the user what is the current off-axis angle so that the user can determine whether that angle is the desired off-axis angle and/or an accurate off-axis angle. In some cases, correction status bar 1002 showing the current view angle 1008, 1010 or 1012 is maintained for a predetermined period of time after the user selects any of buttons 132-140. Here, the user can manually move current view angle 1008 to a previously determined angle, the user knows to be correct for a user location. For instance, a user may know that angle 1008, 1010 or 1012 is the best, most accurate or correct off-axis angle to view video images from, when the user is at a location, such as sitting or disposed in a chair, couch, bed, etc. In some cases, this allows the user to press buttons 132-138, or 140 and check to see if the correct off-axis angle, and if not (e.g., it is not angle 1008, 1010 or 1012) to use buttons 132-138 to update the current angle (e.g., user selected off-axis) until it is the desired angle (e.g., angle 1008, 1010 or 1012).

Remote buttons 132-138 may be used to manually update the current angle, by selection directional buttons to causes the angle to change, so that the user can decide if the non-rectangular aspect ratio with respect to the surface of the display provides a rectangular aspect ratio with respect to the off-axis viewing angle. The user is providing feedback of whether the current view is correct for the viewer's angle. For automatic adjustment, the system may make this calculation based on the detected location of the remote), such as when the signal from the remote is activated by the user holding the remote in front of the users eyes and pushing the current position view button.

In some cases, correction status bar 1002 showing the current view angle is displayed over an image that replaces the current video image, such as by causing the current video image to be replaced with a "bluescreen" or other image (e.g., solid color) with the current (e.g., corrected) aspect ratio having correction status bar 1002 showing the current view angle.

Now that some concepts for correcting video to provide an on-axis view at an off-axis angle have been described, we return to FIG. 1. FIG. 1 shows remote 104 including buttons for up arrow 132, right arrow 134, down arrow 136, left arrow 138, and current position view (CPV) 140. For example, up arrow 132, right arrow 134, down arrow 136, and/or left arrow 138 buttons may be activated or selected by a user to send a signal to receiver 128 identifying or including data (e.g., representing) that the user's location or angle has moved (e.g., changed from the prior location) in that direction with respect to the currently displayed aspect ratio of the displayed video (or received video). Even when the user has not moved, if a change in displayed aspect ratio is desired (e.g., for more accurate manual selection or correction of the image), such a signal may be used or received to update the displayed aspect ratio. In some embodiments, remote 104 may only have buttons 132-138, but not button 140. In other cases remote 104 only has button 140 but not buttons 132-138. It is considered the remote may also include a reset button (not shown) or sequence to cause the off-axis angle to be reset on on-axis angle, such as to allow the user to manually select a more accurate off-axis view angle to provide a more accurate off-axis aspect ratio. It is considered the remote may also include a calibration button (not shown) to calibrate the off-axis viewing angle (e.g., using automatic locating of the remote) by receiving a user selection from a known predetermined (e.g., an on-axis or off-axis) viewing angle.

A remote may include a view correction activation button that causes buttons 132-140 to be active when the activation button is selected and causes buttons 132-140 to be un-active when the activation button is deselected. This way, buttons 132-140 can have other functions, such as by being the standard arrow and select buttons of a remote, that serve other functions when deactivated, and identify a user location or off-axis angle when activated.

Manually Activated Automatic CPV

Also, current position view (CPV) button 140 may be activated or selected by a user to send a signal (e.g., that when received by device 102 causes the device) to automatically correct the aspect ration to provide a current position view, based on the user's/remote's off-axis location. Automatic correction may include or be caused by the signal being received by receiver 128 and/or logic 122. Each activation of button 140 and/or receipt of the resulting signal may cause a single instance of providing a current position view by automatically identifying the user's location or angle is to be automatically determined, such as based on the angle the signal is received from or at. In some cases, current position view (CPV) button 140 may be activated or selected by a user to send a signal to receiver 128 (and logic 122) identifying or including data (e.g., indicating automatic selection of the user location or angle) that the user's location or angle is to be automatically determined, such as based on the angle the signal is received from or at. In some embodiments, device 102, receiver 128, display 106 and/or a separate device may include a sensor to sense the location of the remote. For instance, the center bottom or top of display 106 may include an inexpensive sensor that will constantly scan the area and the received remote signals for device 102, receiver 128, and/or display 106 (e.g., by the sensor scanning the frequency spectrum known for those signals) to adjust the image of the new viewing position. When the sensor receives the signals, it is able to identify or locate the angle the signals are received from, to locate the remote. In other cases, in response, logic 122 may send a reply or feedback signal 124 to the remote that causes the remote to send a specific signal receiver 128 will track or locate the received angle of to locate the remote. In some cases, distance information (e.g., Z axis) is not required to locate the remote, instead, only X,Y Cartesian information with respect to the on-axis angle 217 information (e.g., Z axis direction).

Manually Activated Continuous Automatic CPV

Moreover, for some embodiments, current position view (CPV) button 140 (or another button on the remote, not shown herein) may be used to start continuous automatic tracking (or deselected to discontinue it) of the remote to change the off-axis view angle based on the user's/remote's off-axis location. Thus, the off-axis angle of the remote may be detected over time (e.g., for a period between activation and deactivation), without an additional button selection of the remote. In some cases, activation initiates or causes the above described Manually Activated Automatic CPV to occur on a periodic basis, until deactivation. For instance, logic 122 may locate the remote as noted above, one a periodic basis of say once per 1, 5, 10, 30 or 60 seconds. In some cases, the CPV button or another button may be activated or selected by a user to send a signal to receiver 128 (and logic 122) to cause logic 122 to continually and automatically determine identification of the user's location or angle, such as based on the angle the signal is received from or at. This signal may include data indicating continued automatic selection of the user location or angle. The continuous remote angle identification (e.g., each identification thereof) may be performed as described above for "Manually Activated Automatic CPV", such as to identify or locate the angle the signals are received from, to locate the remote.

For either CPV or continuous automatic tracking, this signal from device 102 to the remote may be sent by an existing transmitter of device 102 used to send signals for other devices or functions, or by an independent transmitter used only to send signals for locating remote 104 to identify an off-axis angle. Similarly, this signal from device 102 to the remote may be received by an existing receiver of the remote used to receive signals for other devices or functions, or by an independent receiver used only to receiver signals for locating remote 104 to identify an off-axis angle.

Activation of button 140 may or may not indicate that the user has moved with respect to the currently displayed aspect ratio of the displayed video (or received video). This may depend on whether the location or angle the user is detected at did or did not change with respect to the currently displayed aspect ratio of the displayed video (or received video). As noted herein, in some embodiments a corrected aspect ratio may be calculated only if the view angle changes; while in other embodiments a corrected aspect ratio may be calculated regardless of whether the view angle changes (e.g., see block 450 of FIG. 4).

Figure 11:
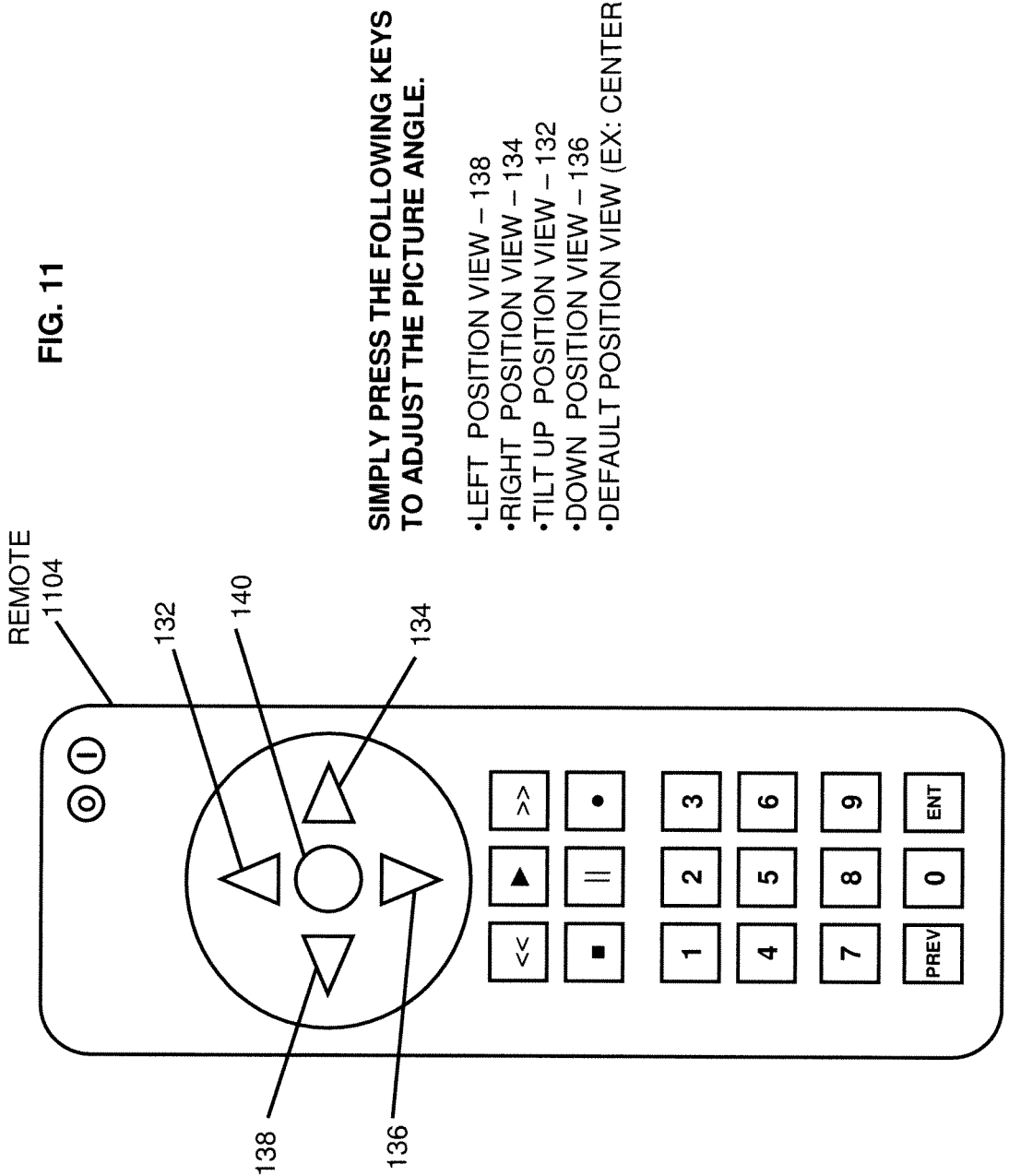
FIG. 11 shows a combined function remote that also includes buttons for identifying an off-axis angle of a viewer, according to embodiments of the invention.

FIG. 11 shows a combined function remote that also includes buttons for identifying an off-axis angle of a viewer. FIG. 11 shows remote 1104, such as a remote of device 102 (e.g., a TV, set-top box, etc.) that also includes buttons for up arrow 132, right arrow 134, down arrow 136, left arrow 138, and current position view (CPV) 140. Thus, it is possible to control other functions of device 102, and/or other devices, as well as use buttons 132-140. In some cases a remote, having buttons 132-140, may be part of 3D glasses, a cordless phone, a PDA, a television remote, a universal remote, a cellular telephone, a laptop computer, a headset, and the like. In some cases remote 1104, having buttons 132-140, may send signals from those buttons using the same transmitter as is used to send signals for other devices or functions. For example, the remote control may incorporate standard television remote buttons as well as a view correction activation to allow the user to select the manual selection, and includes a current position view to allow the user to perform automatic selection.

In some embodiments, video receiver 112 may receive stream 110 by a wired connection, wireless connection, Internet connection, telephone connection, satellite connection, and the like. Video stream 110 may include analog video and/or digital video (e.g. such as coded or compressed digital video data) for display on device 102. Video stream 110 may include audio data, subtitles, menu information, control information, and the like, as known in the industry. Video stream 110 may be any type of video data including television programs, movies, broadcast, "stream", or other video data for device 102. Video stream 110 may include video data to be displayed in any of various aspect ratios (e.g. 3/4, 9/13, etc.) as known in the industry. Video stream 110 may include video with changes in aspect ratio. Video stream 110 may include video data to be displayed in a rectangular aspect ratio, such as to maximize the display size of the entire video image or frame to fit within the area of surface 116. Thus, the aspect ratio of video 110 may be received as a rectangle to maximize the horizontal and/or vertical display size of the image or frame within the maximum horizontal and/or vertical display size of surface 116.

With the new generation of flat screen TVs, 3D TVs, and/or TVs offering web content access, correcting the aspect ratio can be adapted to home environments where video content can be viewed from any of multiple seating angles, thus providing flexibility and convenience.

For TVs offering web content access, correcting the aspect ratio can lead to improvement of cursor recognition and movement; can facilitate typing while surfing the web or editing documents; and can provide mobility equaling elimination of distorted viewing angles.

In some embodiments where it is desired or beneficial to view all web browsers and web pages from a front view position, users do not have the luxury to move around freely and view from different angles. Thus, unless the user is seated directly in front of the computer monitor or TV, user movement away from this position will cause image distortion. Such distortion can be corrected by correcting to a non-rectangular on-axis view as described herein.

Figure 12C:
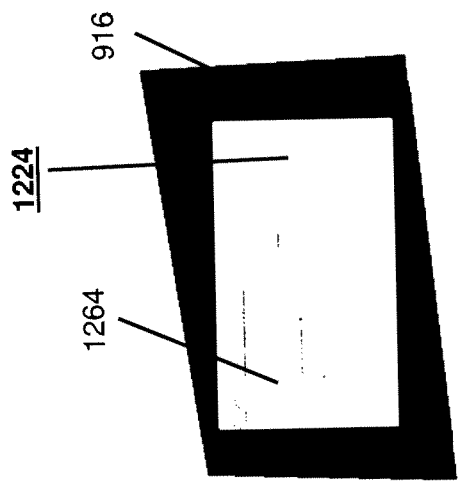
FIGS. 12A-C show off-axis views of images of a Web TV or Computer display having display surface, according to embodiments of the invention.
Figure 12B:
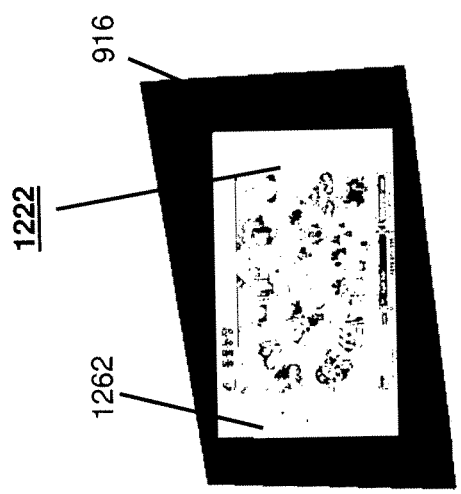
Figure 12A:
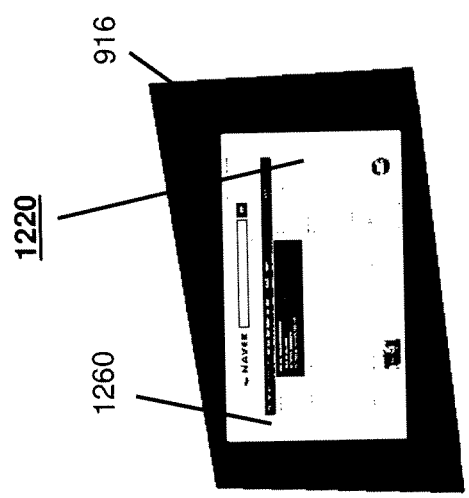

Some embodiments include computer network based (e.g., Internet and/or LAN) video content in or as stream 110. For example, FIG. 12A shows off-axis view 1260 (e.g., similar to 960 of FIG. 9B) of image 1220 of a Web TV or Computer display having display surface 916. Image 1120 may be video for an Internet Portal Site, Homepage, or Search Site. Similarly, FIG. 12B shows off-axis view 1262 (e.g., similar to 960 of FIG. 9B) of image 1222 of a Web TV or Computer display having display surface 916. Image 1222 of an On-Line Game or Application Store. Next, FIG. 12C shows off-axis view 1264 (e.g., similar to 960 of FIG. 9B) of image 1224 of a Web TV or Computer display having display surface 916. Image 1224 of a Search Site or other webpage requiring typing of text in the page.

In some embodiments, system 100 or device 102 may be a electronic device such as a television, computer, set top box, general purpose computing device, special purpose computing device, desk top computer, lap top computer, portable computing device, handheld computing device, gaming device, digital video disk (DVD) player, or other device having or coupled to display 106. It is also considered that system 100, device 102 and/or display 106 may be a video display in a vehicle, automobile, airplane, etc. that has a fixed location, which may be off-axis with respect to predetermined or anticipated off-axis locations of users (e.g., with respect to seats in the vehicle). Thus, correction will provide an on-axis view from the anticipated user's eyes positions.

Thus, video receiver 112 may receive video stream 110 to be displayed on surface 116 of display 106, where video stream 110 has a first rectangular aspect ratio shape to be viewed from an on-axis angle with respect to surface 116. Receiver 128 may receive control signal 114 from remote 104 identifying an off-axis viewing angle with respect to surface 116 (e.g., manual or automatic selection). Logic 122 may be coupled to receiver 112 and receiver 128. Thus, based on the received off-axis viewing angle, logic 122 may change or correct the first rectangular aspect ratio shape of received video stream 110 to a second, non-rectangular aspect ratio shape.

Thus, the rectangular first aspect ratio of received stream 110 may be changed to an isosceles trapezium (isosceles trapezoid) when the off-axis viewing angle is a Cartesian one-dimensional angular change from the on-axis angle (e.g. is a off-axis to the left, right, up, or down). In these cases, the second aspect ratio looks, from an on-axis view, squeezed smaller at one end (e.g., smaller on the left, right, top, or bottom, respectively).

The second aspect ratio may be a non-isosceles trapezium when the off-axis viewing angle is a Cartesian two-dimensional angular change from the on-axis angle (e.g., a Combined or multi-position off-axis view angle) from the on-axis angle (e.g. a change of any of left and up; left and down; right and up; and right and down). In these cases, the second aspect ratio looks, from an on-axis view, squeezed smaller at two ends (e.g., smaller on the left and top; left and bottom; right and top; or right and bottom, respectively).

Logic 122 may also change the first aspect ratio to a second aspect ratio, automatically, based on the off-axis viewing angle, when the aspect ratio of received stream 110 changes. Thus, in addition to a change in aspect ratio of received stream 110, such as a change included in a presentation, movie or TV show, logic 122 causes an additional correction as noted herein.

Logic 122 may be an upgrade of logic to an existing device 102, so logic 122 can identify the off-axis viewing angle using remote 140; and can change or correct the first rectangular aspect ratio shape of received video stream 110 to a second, non-rectangular aspect ratio shape.

Embodiments described herein (e.g., of or including logic 122) may include a television software program (or upgrade) that allows users to manipulate the corrected aspect ration (e.g., to simulate a tilt and swivel angle) of the TV image to achieve the best viewing angle, without moving the physical TV. This can be achieved with many control options such as, Human Face Recognition, Human Sensor Control, however Remote Controlled is a common and cost effective method. The user simply selects the designated arrow on the remote to adjust the tilt or swivel to accommodate their sitting location, should they not be seated directly in front of the television.

Such an upgrade may be paired with a corresponding upgrade of a remote control, such as of a universal or TV manufacturers standard IR remotes. This may include a remote hardware and/or software program (or upgrade) that allows users select an off-axis angle to manipulate the corrected aspect ration, without hindering the distance or coverage areas set within the their current remote specifications. For instance the typical remote functional distance of 4 m~9 m can be maintained. Similarly, the typical off-axis angle degree of remote functional coverage (e.g., 90 degrees in all directions) can be maintained according to the TV's manufacturing remote standards. Such upgrades may truly be a cost effective solution, since no expensive parts are required. In some cases, no calibration process is required in order to begin using the software and/or hardware upgrades.

In some cases, logic 122 may include algorithms, hardware, software, logic, processors, machine executable code, memory, integrated circuits, programmable gate arrays, controllers, buffers, state machines, FPGAs, PLDs, active devices (e.g., transistors, etc.), passive devices (e.g., inductors, capacitors, resistors, etc.), and/or other circuit elements to provide an on-axis view at an off-axis angle.

This picture adjustment technology ensures that the user receives on-axis viewing whether or not they are in front of their TV, thus correcting any loss of picture quality. This is good for 2D TVs, and ideal for 3D TVs, as users should be seated directly in front of their TVs to enjoy the dynamic picture quality offered with 3D technology.

In addition, with the rapidly evolving television industry, flat panels (TV's) are becoming thinner, thus warranting new innovating solutions. Embodiments described herein (e.g., of or including logic 122) may 1) eliminate the need of a costly wall mount used to tilt/swivel an entire TV (or display), as the picture can be corrected to adjust the best viewing angle, without moving the TV; 2) allow consumers the flexibility and convenience to view their TV from any location with compromising viewing quality; 3) eliminate glare and reflection by simply adjusting the aspect ratio instead of the actual display angle; 4) be aesthetically pleasing by enhancing room décor as compared to bulky wall mounts used to physically move a display, thus enhancing the slenderness of flat panels TV's; 5) reduce additional accessory costs of purchasing the wall mount associated with a TV purchase; 6) increase efficiency by more quickly correcting for off-axis viewing, and using less energy/electricity than a wall mount; 7) more effectively provide correction by not having limitations of viewing angles typically associated with wall mounts, and/or wall mount locations (e.g., due to blockages by walls, other furniture, etc.), and maximizes consumers investment of their flat panel TV. On the other hand, using a wall mount that mechanical moves the entire TV, TV's must be physically tilted or swiveled to achieve the "sweet spot" or best viewing angle.

In some cases, the embodiments described herein may be combined with a wall mount so that the display may be positioned as desired or necessary considering constraints, such as limited wall mount locations and/or limited display on-axis angles/orientations (e.g., due to limited wall space, blockages by walls, other furniture, etc.). In these cases, such limitations can be overcome for a display that must be positioned off-axis (e.g., to one side of, or above or below) and/or angled off-axis (e.g., not flat against a wall) with respect to a couch, chair or other preferred viewing location, by providing an on-axis view using embodiments described herein. The wall mount may be attached to or between a back and/or sides of display 106 and an adjacent wall.

In some cases, the embodiments described herein may be combined with a wall mount that mechanically moved the display, so that a user has a choice of physically moving (e.g., tilt/swivel) the display angle and/or using embodiments described herein. In some cases mechanically moving the display may be used for coarse or large view angle adjustments while embodiments described herein are used for fine or smaller view angle adjustments; or vice versa.

Corrected video data or images of (e.g., in the corrected aspect ratio video from) stream 110 may then be output by logic 122 to output to display 126, having (e.g., with or at) the second, non-rectangular aspect ratio to be displayed on surface 116. Consequently, the output video may be displayed on surface 116 with (e.g., at or having) the second, non-rectangular aspect ratio.

Display 106 may be a two-dimensional TV or three-dimensional TV or display. In some cases, display 106 may be a cathode ray tube (CRT), liquid crystal display (LCD), light emitting diode (LED) display, organic light emitting diode (OLED) display, organic electroluminescent device (OELD) display. In some cases, display 106 will only be an LED, LCD, OLED, or OELD display. In some embodiments, display 106 is only a liquid crystal display (LCD) and/or a light emitting diode (LED) video display. For some embodiments, display 106 is a display of a television, computer, set top box, general purpose computing device, special purpose computing device, desk top computer, lap top computer, portable computing device, handheld computing device, gaming device, digital video disk (DVD) player, video billboard advertisement display (e.g., LCD or LED), or other video capable device.

Display 106 may be part of device 102, such as by being housed in the same frame, box, or package as device 102. Display 106 may be integrated with device 102. Alternatively, display 106 may be separate from device 102, such as being coupled to device 102 by one or more cables, wireless connection, and the like (e.g. between output 126 and display 106). Display may have a maximum viewable area or space to display video images. For instance display surface (e.g., 116, etc.) may include all the area of a video image from stream 110, so that none of the image is beyond the borders or outside the display surface (and thus not displayed).

According to embodiments, the first rectangular aspect ratio may be a rectangular aspect ratio shape of an entire image frame of the video data, and not just of a portion, a shape, or a feature of the image frame. In some cases, the first and second aspect ratios include the same video image "scene" (e.g., information or data) so that the entire received image (e.g., frame) is displayed on the display. This may be different than where part of the image is not being displayed, while only a desired portion of the frame is being displayed, based on the view angle, to give the display an "open window" 3D effect of looking through a window when the viewer moves/changes view angle).

According to embodiments, the first rectangular aspect ratio is a maximum viewable aspect ratio that will fit on the display surface; and the non-rectangular aspect ratio is smaller than the maximum viewable aspect ratio.

FIG. 13 is an example of a flow diagram of video display correction to provide on-axis view, according to embodiments of the invention. FIG. 13 shows process 1300, such as a process described above for or performed by device 102, logic, 122, and/or apparatus/system 100. Process 1300 may also provide aspect ratios shown in FIGS. 2A-B and 3A-B. For example, process 1300, may be a process to change received video having aspect ratio 210 shown in FIGS. 2A-B to aspect ratio 220 shown in FIGS. 3A-B, or another corrected aspect ratio as described above (e.g., see at least FIGS. 5B, 7B and 9B). The change may be performed by system 100, device 102, and/or logic 122.

At block 1310 a stream of video data is received having a first aspect ratio for a display surface. Block 1310 may include converting or decoding the stream of video data. Block 1310 may include putting the stream of video data into or at the first aspect ratio.

At block 1320 a user selection of an off-axis viewing angle is received or identified. According to embodiments, the on-axis location is perpendicular to a center location of the display surface; and the user selection of an off-axis viewing angle is an off-axis location of the user with respect to the center of the display surface. The off-axis viewing angle may be an angle between the on-axis location with respect to a surface of the display and an angle up to a location of eyes of a viewer with respect to the surface of the display.

At block 1330 it is determined whether the users selection is from a manual selection or an automatic selection. According to embodiments, the user selection is a manual selection or an automatic selection received from (at, or provided by) a remote control by pressing or selecting buttons, keys or touchscreen controls of the remote. Also, the selection may be received from (at, or provided by) a computer keyboard by pressing or selecting buttons, keys or touchscreen controls of a keyboard (e.g., such as of a laptop computer).

If at block 1330 the selection is automatic, processing continues to block 1340 where the user and/or remote providing the selection is located. Block 1340 may include locating an off-axis viewing angle of the user or remote, automatically, such as by sending communication signal 124 to remote 104 and/or receiving control signal 114 from remote 104 to locate an angle at which remote 104 is off-axis with respect to display surface 116. Automatic selection may include receiving activation of a current position view button of a remote (caused by a user selecting button 140), sending a signal from the remote, and determining the off-axis viewing angle based on an angle the signal is received from.

Block 1340 may include automatically locating an off-axis viewing angle, or continually automatically locating an off-axis viewing angle as described herein, such as using current position view (CPV) 140. In some embodiments a corrected aspect ratio may be calculated only if the view angle changes; while in other embodiments a corrected aspect ratio may be calculated regardless of whether the view angle changes. Block 1340 may include receiving a user selection or press of button 140. The user may hold remote 104 near the users face or eyes or accurate viewing angle automatic location.

If the user selection at block 1330 is manual, processing continues to block 1345 where the manual selection of the off-axis viewing angle is determined or calculated. A manual selection may include receiving at a remote or keyboard (e.g., as provided by a user's selection) activation of up, down, left, and/or right direction (arrow) keys, until the viewer is satisfied with the corrected view from the off-axis angle.

Block 1345 may include changing or correcting an on-axis angle, or prior off-axis angle based on one or more inputs to buttons 132-138 of remote 104. For example, block 1345 may include calculating the off-axis angle using or based on an aggregate of all of buttons 132-138 pushed to provide a change from the on-axis angle. It is considered the remote may also include a reset button (not shown) or sequence to cause the off-axis angle to be reset on on-axis angle, such as to allow the user to manually select a more accurate off-axis view angle to provide a more accurate off-axis aspect ratio.

At block 1350 it is determined whether the off-axis viewing angle is a change from the on-axis angle, or from a prior off-axis angle. If it is not, processing returns to block 1310. If at block 1350 there is a change, processing continues to block 1360.

At block 1360 the first rectangular aspect ratio, or a prior non-rectangular aspect ratio is changed or corrected to a subsequent second, non-rectangular aspect ratio based on the off-axis viewing angle, or angle change. Block 1360 may include calculating a subsequent second, non-rectangular aspect ratio based on the off-axis viewing angle, or angle change. Block 1360 may include processes described above for FIGS. 1-13. For example, Block 1360 may include displaying a status bar as noted for FIG. 10.

It is considered that calculations of the changes or corrections to aspect ratio corners (and/or sides) for different off-axis view angles can be performed using known mathematics and/or algorithms. Such calculations may include coordinate system conversions, and the like. Such calculations may include conversions between spherical coordinates of the view angles, and Cartesian coordinates of the corrected aspect ratio corners on the display surface (and/or sides) for different off-axis view angles.

At block 1370 the stream of received video data is output at, having, or with a second aspect ratio change or correction of block 1360. Block 1370 may include changing the first rectangular aspect ratio to a second non-rectangular aspect ratio; or changing a prior second non-rectangular aspect ratio to a new second non-rectangular aspect ratio. Block 1370 may include outputting at the second non-rectangular aspect ratio, a stream of video having the received video data.

At block 1380 the video stream is displayed on a display surface at, having, or with the second (updated) non-rectangular aspect ratio. Block 1380 may include displaying on the display surface, for an on-axis view, the output stream of video at the second non-rectangular aspect ratio (e.g., ratio 310) so that from off-axis view, the display is rectangular (e.g., ratio 560).

In some cases, blocks 1330, 1340 and 1345 may be represented by either block 1345 or block 1340, such as where the user selection or remote only provides a manual selection or only provides an automatic selection.

In some embodiments, process 1300 may exclude block 1350, such as where the second aspect ratio is recalculated whenever a user selection of an off-axis viewing angle is received, without determining whether the off-axis viewing angle is a change from the prior viewing angle.

According to embodiments, the corrections described herein (e.g., FIGS. 4-13) may be performed using calculations of the corrections to correct the corners for different off-axis view angles may be performed using known engineering mathematics and/or algorithms as described above for FIGS. 2-3.

Unless specifically stated otherwise as apparent from the preceding discussion, it is appreciated that throughout the description, discussions utilizing terms such as "correcting" or "changing" or "receiving" or "selecting" or "displaying" or "updating" or "identifying" or "determining" or the like, may refer to the action and processes of FIGS. 1-13, device 102 and/or system 100 (e.g., or similar electronic device), that manipulates and transforms video data represented as physical (electronic quantities within the device's registers and memories into other video data similarly represented as physical quantities within the device and/or system memories or registers or other such information storage, transmission and/or display devices.

The present invention also relates to logic of a device and/or system for performing the video display correction to provide an on-axis view at an off-axis angle (e.g., operations or processes) herein. This logic may include circuitry specially constructed for the required purposes, and/or it may comprise a special (or general) purpose TV, computer, and the like, selectively activated or specially configured by a computer program stored in therein. Such a computer program (e.g., program instructions) may be stored in a computer readable (e.g., non-volatile) storage medium, such as, but not limited to, any type of disk including floppy disks, optical disks, compact disc read-only memory ("CD-ROM"), and magnetic-optical disks, read-only memories ("ROMs"), erasable programmable read-only memories ("EPROMs"), electrically-erasable read-only memories ("EEPROMs"), BIOS, flash memories, magnetic or optical cards, or any type of media suitable for storing electronic instructions. Such a device and/or system may also include a processor coupled to the storage medium to execute the stored instructions. The processor may also be coupled to a volatile memory (e.g., RAM) into which the instructions are loaded from the storage memory (e.g., non-volatile memory) during execution by the processor. The processor and memory(s) may be coupled to receive various video streams, such as to perform the video display correction to provide an on-axis view at an off-axis angle using one or more of the mechanisms noted above for FIGS. 1-13. Use of and/or operations performed by the mechanisms may be described as a machine implemented means or method. In some cases, the mechanisms or operations described herein (such as to perform one or more of FIGS. 1-13) may be embodied in a machine-readable medium (e.g., non-volatile memory) having stored thereon data and instructions to cause a programmable processor to perform those operations.

In some cases, the mechanisms or operations described herein (such as to perform one or more of FIGS. 1-13) may be embodied in electronic or programmable logic or components configured to perform those operations. The logic may include specific hardware components of a specialized TV, computer, and the like (e.g., device 102, system 100, a television, a computer, a set-top box, and/or a display device) that contains specialized hardwired logic. Those operations might alternatively be performed only by hardware; only by software; or by any combination of software programmed computer components and custom hardware components.

The mechanisms, data, tables, math and figures presented herein are not inherently related to any particular TV, computer, and the like. Various general or special purpose systems may be used with programs in accordance with the teachings herein, or it may prove convenient to construct more specialized apparatus to perform the required mechanism or processes. The required structure for a variety of these systems will appear from the descriptions herein. In addition, the present invention is not described with reference to any particular programming language or logic. It will be appreciated that a variety of programming languages may be used to implement the teachings of the invention as described herein.

In the foregoing specification, specific embodiments are described. However, various modifications and changes may be made thereto without departing from the broader spirit and scope of embodiments as set forth in the claims. The specification and drawings are, accordingly, to be regarded in an illustrative rather than a restrictive sense.

What is claimed is:

1. A method comprising:
receiving a stream of video data to be displayed on a stationary display surface of a display, the video data having a first rectangular aspect ratio to be viewed from an on-axis location with respect to the display surface;
receiving a user selection of an a 2 dimensional off-axis viewing angle with respect to the display surface; wherein the user selection is an automatic selection signal received from a wireless remote control;
determining the off-axis viewing angle based on an angle the signal is received from; and
changing the first rectangular aspect ratio to a second, non-rectangular 2 dimensions change in aspect ratio based on the 2 dimensional off-axis viewing angle with respect to the on-axis location,
wherein receiving the user selection further comprises receiving a plurality of wireless control signals over time from the wireless remote, the control signals identifying a plurality of off-axis viewing angles with respect to the surface;
wherein determining the off-axis viewing angle comprises determining a plurality of off-axis viewing angles over time based on a plurality of angles the plurality of wireless control signals are received from over time; and
wherein changing the first rectangular aspect ratio comprises changing the first rectangular aspect ratio to a plurality of second, non-rectangular 2 dimensions changes in aspect ratio over time, based on the 2 dimensional off-axis viewing angles over time with respect to the on-axis location.

2. The method of claim 1, further comprising displaying the stream of video data on the display surface at the second, non-rectangular aspect ratio.

3. The method of claim 1, wherein the first rectangular aspect ratio is a rectangular aspect ratio shape of an entire image frame of the video data.

4. The method of claim 3, wherein the first rectangular aspect ratio is a maximum viewable image area that will fit on the display surface; and the non-rectangular aspect ratio is smaller than the maximum viewable aspect ratio.

5. The method of claim 1, wherein the non-rectangular aspect ratio with respect to the surface of the display is a rectangular aspect ratio with respect to the off-axis viewing angle.

6. The method of claim 1, wherein selection of each directional button causes the changing, so that the user can decide if the non-rectangular aspect ratio with respect to the surface of the display provides a rectangular aspect ratio with respect to the off-axis viewing angle.

7. The method of claim 1, wherein the off-axis viewing angle is one of a tilt angle, a swivel angle, and a tilt and swivel angle.

8. The method of claim 7, wherein the angle is one of five, ten, fifteen, and twenty degrees.

9. The method of claim 1, further comprising:
displaying the stream of video data on the display surface at the second, non-rectangular aspect ratio;
displaying a status image indicating a current aspect ratio with respect to the surface of the display, and available range of non-rectangular aspect ratios with respect to the surface of the display; and
updating the status image to indicate a new aspect ratio with respect to the surface of the display upon receiving the user selection.

10. A non-transitory machine-readable medium having stored thereon data and instructions to cause a programmable processor to:
receive a stream of video data to be displayed on a display surface of a display, the video data having a first rectangular aspect ratio to be viewed from an on-axis location with respect to the display surface;
receive a user selection of an off-axis viewing angle with respect to the display surface, wherein the user selection is an automatic selection signal received from a wireless remote control,
determining an off-axis viewing angle based on an angle the signal is received from; and
change the first rectangular aspect ratio to a second, non-rectangular aspect ratio based on the off-axis viewing angle, wherein the display is stationary and that the aspect ratio is changed in 2 dimensions based on a 2 dimensional, off axis location or movement of the user with respect to the on-axis location, wherein receiving the user selection further comprises receiving a plurality of wireless control signals over time from the wireless remote, the control signals identifying a plurality of off-axis viewing angles with respect to the surface;

wherein determining the off-axis viewing angle comprises determining a plurality of off-axis viewing angles over time based on a plurality of angles the plurality of wireless control signals are received from over time; and wherein changing the first rectangular aspect ratio comprises changing the first rectangular aspect ratio to a plurality of second, non-rectangular 2 dimensions changes in aspect ratio over time, based on the 2 dimensional off-axis viewing angles over time with respect to the on-axis location.

11. The medium of claim 10, having stored thereon data and instructions to cause the programmable processor to:
display the stream of video data on the display surface at the second, non-rectangular aspect ratio.

12. An apparatus comprising:
a video receiver to receive a video stream to be displayed on a surface of display, wherein the video stream has a first rectangular aspect ratio shape to be viewed from an on-axis angle with respect to surface;
a wireless receiver to receive a wireless control signal from a wireless remote, the control signal identifying an off-axis viewing angle with respect to the surface, wherein the control signal is an automatic selection signal received from the wireless remote control; and
logic coupled to the video receiver and the wireless receiver, the logic to, determine an off-axis viewing angle based on an angle the signal is received from, and based on the received off-axis viewing angle, change the first rectangular aspect ratio shape of received video stream to a second, non-rectangular aspect ratio shape, wherein the display is stationary and that the aspect ratio is changed in 2 dimensions based on a 2 dimensional, off axis location or movement of the user with respect to the on-axis location,
wherein receiving the control signal further comprises receiving a plurality of wireless control signals over time from the wireless remote, the control signals identifying a plurality of off-axis viewing angles with respect to the surface;
wherein determining the off-axis viewing angle comprises determining a plurality of off-axis viewing angles over time based on a plurality of angles the plurality of wireless control signals are received from over time; and
wherein changing the first rectangular aspect ratio comprises changing the first rectangular aspect ratio to a plurality of second, non-rectangular 2 dimensions changes in aspect ratio over time, based on the 2 dimensional off-axis viewing angles over time with respect to the on-axis location.

13. The device of claim 12, further comprising:
a display coupled to the logic, the display to display the stream of video data on the display surface at the second, non-rectangular aspect ratio.

14. The device of claim 12, wherein the first rectangular aspect ratio is a rectangular aspect ratio shape of an entire image frame of the video data, and is a maximum viewable image area that will fit on the display surface; and the non-rectangular aspect ratio is smaller than the maximum viewable aspect ratio.

15. The device of claim 12, wherein the remote includes at least one manual selection button and an automatic selection button; wherein activation of each button causes the remote to send a signal to the wireless receiver; and wherein only activation of the automatic selection button causes the logic to determine the off-axis viewing angle based on an angle the signal is received from at the wireless receiver.

16. The device of claim 12, wherein the logic comprises one of software and hardware.

17. A system comprising:
a device including:
a video receiver to receive a video stream to be displayed on a surface of display, wherein the video stream has a first rectangular aspect ratio shape to be viewed from an on-axis angle with respect to surface;
a wireless receiver to receive a wireless control signal from a wireless remote, the control signal identifying an off-axis viewing angle with respect to the surface, wherein the control signal is an automatic selection signal; and
logic coupled to the video receiver and the wireless receiver, the logic to, determine an off-axis viewing angle based on an angle the signal is received from, and based on the received off-axis viewing angle, change the first rectangular aspect ratio shape of received video stream to a second, non-rectangular aspect ratio shape;
a display coupled to the logic, the display to display the stream of video data on the display surface at the second, non-rectangular aspect ratio, wherein the first rectangular aspect ratio is a rectangular aspect ratio shape of an entire image frame of the video data, and is a maximum viewable image area that will fit on the display surface; and the non-rectangular aspect ratio is smaller than the maximum viewable aspect ratio;
the display directly mounted to a wall; and
a remote including an automatic selection button; wherein activation of the button causes the remote to send a signal to the wireless receiver; and wherein activation of the automatic selection button causes the logic to determine the off-axis viewing angle based on an angle the signal is received from at the wireless receiver, wherein the display is stationary and that the aspect ratio is changed in 2 dimensions based on a 2 dimensional, off axis location or movement of the user and provides a multi-off-axis view angle correction with respect to the on-axis location,
wherein receiving the control signal further comprises receiving a plurality of wireless control signals over time from the wireless remote, the control signals identifying a plurality of off-axis viewing angles with respect to the surface;
wherein determining the off-axis viewing angle comprises determining a plurality of off-axis viewing angles over time based on a plurality of angles the plurality of wireless control signals are received from over time; and
wherein changing the first rectangular aspect ratio comprises changing the first rectangular aspect ratio to a plurality of second, non-rectangular 2 dimensions changes in aspect ratio over time, based on the 2 dimensional off-axis viewing angles over time with respect to the on-axis location.

18. A non-transitory machine-readable medium having stored thereon data and instructions to cause a programmable processor to:
receiving a stream of video data to be displayed on a stationary display surface of a display, the video data having a first rectangular aspect ratio to be viewed from an on-axis location with respect to the display surface;

receiving a user selection of an a 2 dimensional off-axis viewing angle with respect to the display surface; wherein the user selection is an automatic selection signal received from a wireless remote control;

determining the off-axis viewing angle based on an angle the signal is received from;

changing the first rectangular aspect ratio to a second, non-rectangular 2 dimensions change in aspect ratio based on the 2 dimensional off-axis viewing angle with respect to the on-axis location;

receiving a plurality of wireless control signals over time from the wireless remote, the control signals identifying a plurality of off-axis viewing angles with respect to the surface;

determining a plurality of off-axis viewing angles over time by tracking a plurality of angles the plurality of wireless control signals are received from over time; and changing the first rectangular aspect ratio to a plurality of second, non-rectangular 2 dimensions changes in aspect ratio over time, based on the 2 dimensional off-axis viewing angles over time with respect to the on-axis location.

19. A method comprising:

receiving a stream of video data to be displayed on a stationary display surface of a display, the video data having a first rectangular aspect ratio to be viewed from an on-axis location with respect to the display surface;

receiving a user selection of an a 2 dimensional off-axis viewing angle with respect to the display surface; wherein the user selection is an automatic selection signal received from a wireless remote control;

determining the off-axis viewing angle based on an angle the signal is received from; and changing the first rectangular aspect ratio to a second, non-rectangular 2 dimensions change in aspect ratio based on the 2 dimensional off-axis viewing angle with respect to the on-axis location;

displaying the stream of video data on the display surface at the second, non-rectangular aspect ratio;

displaying a status image indicating a current aspect ratio with respect to the surface of the display, and available range of non-rectangular aspect ratios with respect to the surface of the display; and updating the status image to indicate a new aspect ratio with respect to the surface of the display upon receiving the user selection;

the display directly mounted to a wall, and wherein the status image includes a correction status bar, having circles showing the available on-axis view or angle range, and having a line drawn from a view through angle points towards the user, such as at the current axis angle.

20. The method of claim 19, wherein upon receiving the user selection, the correction status bar is updated to indicate a changed to the on-axis view or angle, and to display a new aspect ratio with respect to the surface of the display, wherein the correction status bar is one of a complete overlay, a watermark or a semitransparent overlay over the display of the stream of video data.

21. The medium of claim 18, having stored thereon data and instructions to cause the programmable processor to display the stream of video data on the display surface at the second, non-rectangular aspect ratio.

22. The medium of claim 18, wherein the first rectangular aspect ratio is a rectangular aspect ratio shape of an entire image frame of the video data.

23. The medium of claim 18, wherein the first rectangular aspect ratio is a maximum viewable image area that will fit on the display surface; and the non-rectangular aspect ratio is smaller than the maximum viewable aspect ratio.

* * * * *